US010862905B2

(12) United States Patent
Zettel, II et al.

(10) Patent No.: US 10,862,905 B2
(45) Date of Patent: Dec. 8, 2020

(54) INCIDENT RESPONSE TECHNIQUES

(71) Applicant: ServiceNow, Inc., Santa Clara, CA (US)

(72) Inventors: Kurt Joseph Zettel, II, Nashville, TN (US); Scott Alan Lewis, Sunnyvale, CA (US); James Erbes, San Jose, CA (US); Richard Reybok, Campbell, CA (US); Harold Byun, Belmont, CA (US); Ryan Currier, Cupertino, CA (US); Michel Abou Samah, San Diego, CA (US); Sachin Nayak, Santa Clara, CA (US); Patrice Tollenaere, San Francisco, CA (US); Zhe Wang, San Francisco, CA (US)

(73) Assignee: ServiceNow, Inc., Santa Clara, CA (US)

( * ) Notice: Subject to any disclaimer, the term of this patent is extended or adjusted under 35 U.S.C. 154(b) by 244 days.

(21) Appl. No.: 15/906,771

(22) Filed: Feb. 27, 2018

(65) Prior Publication Data
US 2019/0268354 A1    Aug. 29, 2019

(51) Int. Cl.
*H04L 29/06* (2006.01)
*G06F 3/0482* (2013.01)

(52) U.S. Cl.
CPC ........ *H04L 63/1416* (2013.01); *G06F 3/0482* (2013.01); *H04L 63/1425* (2013.01); *H04L 63/1441* (2013.01); *H04L 63/1483* (2013.01); *H04L 63/20* (2013.01)

(58) Field of Classification Search
CPC ............. H04L 63/1416; H04L 63/1425; H04L 63/144; H04L 63/1483; H04L 63/20; G06F 3/0482
See application file for complete search history.

(56) References Cited

U.S. PATENT DOCUMENTS

| | | | |
|---|---|---|---|
| 2015/0365438 A1* | 12/2015 | Carver | H04L 63/1441 726/1 |
| 2016/0226904 A1* | 8/2016 | Bartos | G06F 16/285 |
| 2018/0020021 A1* | 1/2018 | Gilmore | H04L 63/1408 |
| 2018/0322433 A1* | 11/2018 | van Heusden | G06Q 10/06393 |
| 2019/0095241 A1* | 3/2019 | Ago | G06F 9/5005 |
| 2019/0097909 A1* | 3/2019 | Puri | H04L 41/0604 |
| 2019/0147096 A1* | 5/2019 | Ponnada | G06F 16/2465 707/776 |
| 2019/0260769 A1* | 8/2019 | Sharon | H04L 63/1441 |

* cited by examiner

*Primary Examiner* — Techane Gergiso
(74) *Attorney, Agent, or Firm* — Fletcher Yoder PC

(57) ABSTRACT

Providing are incident response techniques useful for personas with a variety of experience levels are described. The incident response techniques include a graphical user interface (GUI) for providing a variety of different views for different personas. The graphical user interface may provide a landing page for providing a queue of risk-score prioritized incidents, an incident playbook for providing default or customizable instructions for resolving a particular incident to lesser-experienced personas, an explore container for facilitating efficient navigation of data associated with a particular incident by more-experienced personas, and an activity stream container for providing an overview of activities that have been performed with regard to a particular incident to more-experienced or supervising personas. The explore container may also be integrated with tools for performing actions with the data without leaving the graphical user interface.

25 Claims, 18 Drawing Sheets

| NUMBER | RISK SCORE | SHORT DESCRIPTION | CATEGORY | SOURCE | STATE | LAST UPDATED | CREATED |
|---|---|---|---|---|---|---|---|
| ▼ SIR0010273 | 100 | USER REPORTED PHISHING- SUBJECT:CLICK THIS LINK | PHISHING | EMAIL | ERADICATE | 2018-01-24 12:28:23 | 2018-01-19 14:15:56 |

DESCRIPTION

PLEASE REVIEW THIS EMAIL ──── FROM:SUZZANE BAKER SENT:FRIDAY, JANUARY 19, 2018 2:14PM
TO:SIRDEMO1@SERVICE-NOW.COM
SUBJECT:CLICK THIS LINK PLEASE CLICK ON THIS LINK HTTP

| ASSIGNMENT GROUP | ASSIGNED TO | | BUSINESS IMPACT | PRIORITY |
|---|---|---|---|---|
| SIRT | ANALYST TESTER | | 2-HIGH | 2-HIGH |

| ▲ SIR0001759 | 92 | P2P /STREAMING (HIGH BANDWIDTH UTILIZATION) | POLICY VIOLATION | PHONE | RECOVER | 2018-01-17 09:25:30 | 2017-09-06 14:48:25 |

INCIDENT RESPONSE TECHNIQUES

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The subject matter disclosed herein generally relates to incident response. In particular, the current disclosure relates to incident response tools useful for personas with a variety of experience levels.

Facilitating information security requires constant identification and response to threats, such as viruses, worms, phishing attacks, Trojan horses, intellectual property theft, or any policy violations. In order to effectively monitor threats to information security, a large amount of data must be analyzed. As such, many companies and organizations have developed their own threat identification and resolution procedures for information security personnel or contract other companies specialized in information security. These personnel must be able to efficiently navigate any collected data in order to quickly respond to any identified threats and prevent or mitigate any resulting damage. Additionally, companies and organizations may be subject to compliance requirements which necessitate that information security personnel systematically perform investigations in a predetermined way.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a tangible, non-transitory, machine-readable medium includes machine-readable instructions that when executed by one or more processors cause the one or more processors to receive a first security indication of a first security incident record stored in a first security incident record data store, and generate and present a security incident response graphical user interface (GUI). Further, the GUI includes a first overview container with one or more widgets related to the first incident record, a first explore container with a set of security incident data categories, and a first activity stream container with a list of all actions associated with the first security incident record. Each incident data category has one or more lists of records associated with the first security incident record. The tangible, non-transitory, machine-readable medium also includes machine-readable instructions that when executed by one or more processors cause the one or more processors to render, via the security incident response GUI, one or more lists of records with a set of selectable actions associated with the lists of records, receive a user selection of one of the selectable actions, and implement an action associated with the user selected selectable action, based upon the user selection, without leaving the security incident response GUI.

In another embodiment, an incident response system includes at least one computer configured to receive an indication of an incident record stored in an incident record data store, and generate and present an incident response graphical user interface (GUI). Further, the GUI includes an overview container with one or more widgets related to the incident record, an explore container with a set of incident data categories, and an activity stream container with a list of all actions associated with the incident record. Each incident data category has one or more lists of records associated with the incident record. The incident response system also includes at least one computer configured to generate and render, in the security incident response GUI, a playbook associated with the security incident record, the playbook comprising a series of tasks to be implemented for resolution of the security incident.

In another embodiment, a tangible, non-transitory, machine-readable medium includes machine-readable instructions that when executed by one or more processors cause the one or more processors to receive an indication of an incident record stored in an incident record data store, identify a category and subcategory of the incident record, select a playbook based on the category and the subcategory, from one or more playbooks stored in a playbook data store, and generate and render a playbook graphical user interface (GUI) based on the selected playbook. Further, the playbook GUI includes a series of tasks to be implemented for resolution of the incident.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The description herein makes reference to the accompanying drawings, wherein like reference numerals refer to like parts throughout the several views.

FIG. 6 is an illustration of a GUI for facilitating the display of additional information associated with a particular security incident, in accordance with an embodiment;

FIG. 13 is an illustration of a GUI for facilitating the management of attachments associated with a respective security incident, in accordance with an embodiment;

DETAILED DESCRIPTION

Figure 1:
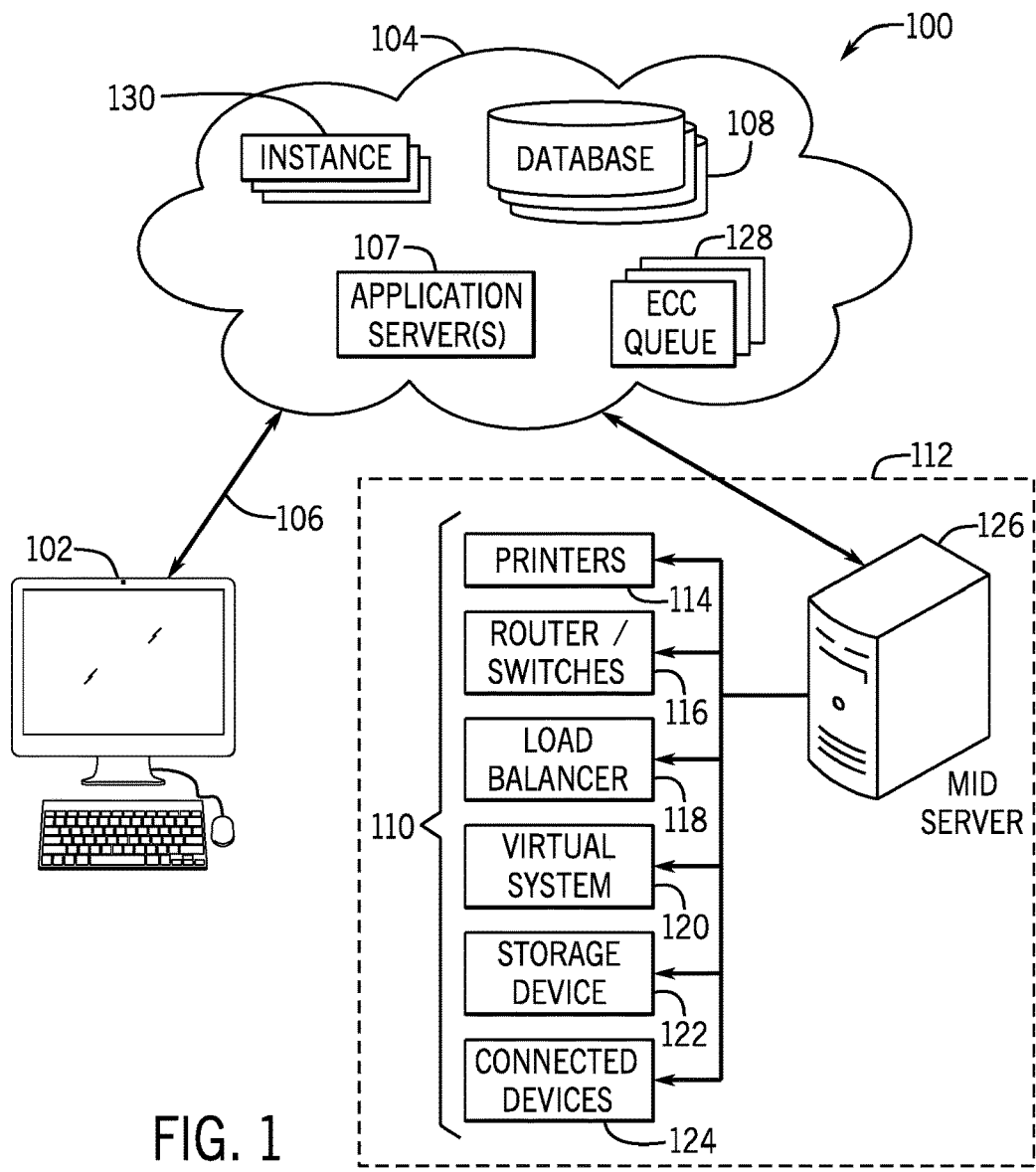
FIG. 1 is a block diagram of a generalized distributed computing system utilizing a cloud service type platform and databases, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The following discussion relates to threat analysis, resolution, and reporting workflows for information security systems. However, this is not meant to limit the current techniques to information security. Indeed, the current techniques may be useful in a number of different contexts. For example the current techniques may be applied to Human Resources (HR) systems or any system that may benefit from the analysis of data and the performance and reporting of tasks based on the data.

Keeping this in mind, the discussion now turns to an information security example. A security analyst must be able to efficiently navigate data related to a particular security incident and quickly respond accordingly to mitigate and/or resolve any threats based on the data. Such threats may include viruses, worms, phishing attacks, Trojan horses, intellectual property theft, and policy violations. However, not all security analysts have the same experience and/or knowledge in the analysis and the resolution of security incidents. New or junior analysts may require guidance to bring a security incident to closure. In contrast, senior analysts may possess the knowledge of how to bring a security incident to closure but need powerful tools to navigate the data related to the security incident and to act upon the data. Although the discussion refers to two main classes (e.g., personas) of analysts, junior analysts (e.g., less-experienced personas) and senior analysts (e.g., more-experienced personas), it should be appreciated that in some embodiments, analysts may be grouped into more than two classes with differing and/or overlapping needs based on their experience and knowledge. For example, a third class of analysts may include a manager (e.g., more-experienced or supervising persona) that requires the ability to easily understand the history and current state of a particular incident at any time.

A graphical user interface is described herein that provides risk score-based prioritization of security incidents such that security analysts may resolve security incidents with the highest risk score first. In this way, security incidents that pose the biggest threat to their respective environment may be addressed as fast as possible. Additionally, the graphical user interface may provide a variety of different views for different personas (e.g., security analysts with different amounts of experience and/or knowledge with regard to a particular incident). In particular, certain views will facilitate tasks for less-experienced personas, while other views will facilitate tasks for increasingly-experienced personas. By providing a variety of different views, pertinent information can be quickly and efficiently provided to a variety of personas with different experience levels, facilitating reduced incident response time and increased productivity. For example, for less-experienced personas, an automated playbook may guide a security analyst through the steps necessary to bring a security incident to closure. The automated playbook may provide a default guide with pre-defined, step-by-step instructions for resolving a particular security incident, or the automated playbook may provide a fully or partially customizable workflow.

In another example, for more-experienced personas, the graphical user interface may provide a view of all data associated with and/or related to a particular incident. The data may be grouped into one or more lists to facilitate quick and efficient navigation of the data. Additionally, the lists of data may further be grouped into categories to facilitate faster and easier navigation of the lists of data. Each list and/or each category may be related to a characteristic of the security incident itself or generally related to a characteristic of security incident response. The graphical user interface may also integrate with a number of tools for analyzing and resolving a security incident. Personas of varying levels of experience and/or knowledge may utilize these tools with regard to a particular security incident without leaving the graphical user interface or corresponding internet portal. Thus, the graphical user interface may provide the ability to take context sensitive actions to security analysts.

In another example, for more-experienced personas and/or managerial personas, the graphical user interface may provide an indication of the current state of a particular security incident as well as a history of all actions, user-made and/or machine-made, performed regarding the security incident. This view may facilitate the quick and easy understanding of the history and current state of an incident at any time.

By way of introduction to the present concepts and to provide context for the examples discussed herein, FIG. 1 is a block diagram of a system 100 that utilizes a distributed computing framework, which may perform one or more of the techniques described herein. As illustrated in FIG. 1, a client 102 communicates with a platform 104, such as a cloud service platform, over a communication channel 106. The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously.

The platform 104 may include any suitable number of computing devices (e.g., computers) in one or more locations that are connected together using one or more networks. For instance, the platform 104 may include various computers acting as servers in datacenters at one or more geographic locations where the computers communicate using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks or entirely using network connections when the client 102 and the platform 104 share a common network. Although only a single client 102 is shown connected to the platform 104, it should be noted that platform 104 may connect to multiple clients (e.g., tens, hundreds, or thousands of clients).

Through the platform 104, here a cloud service type platform, the client 102 may connect to various devices with various functionality, such as gateways, routers, load balancers, databases, application servers running application programs on one or more nodes, or other devices that may be accessed via the platform 104. For example, the client 102 may connect to an application server 107 and/or one or more databases 108 via the platform 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104. The application nodes may be implemented using processing threads, virtual machine instantiations, or other computing features of the application server 107. Moreover, the application nodes may store, evaluate, or retrieve data from the databases 108 and/or a database server.

The databases 108 may contain a series of tables containing information about assets and enterprise services controlled by a client 102 and the configurations of these assets and services. The assets and services include configuration items (CIs) 110 that may be computers, other devices on a network 112 (or group of networks), software contracts and/or licenses, or enterprise services. The CIs 110 may include hardware resources (such as server computing devices, client computing devices, processors, memory, storage devices, networking devices, or power supplies); software resources (such as instructions executable by the hardware resources including application software or firmware); virtual resources (such as virtual machines or virtual storage devices); and/or storage constructs (such as data files, data directories, or storage models). As such, the CIs 110 may include a combination of physical resources or virtual resources. For example, the illustrated embodiment of the CIs 110 includes printers 114, routers/switches 116, load balancers 118, virtual systems 120, storage devices 122, and/or other connected devices 124. The other connected devices 124 may include clusters of connected computing devices or functions such as data centers, computer rooms, databases, or other suitable devices. Additionally or alternatively, the connected devices 124 may include facility-controlling devices having aspects that are accessible via network communication, such as heating, ventilation, and air conditioning (HVAC) units, fuel tanks, power equipment, and the like. The databases 108 may include information related to CIs 110, attributes (e.g., roles, characteristics of elements, etc.) associated with the CIs 110, and/or relationships between the CIs 110.

In some embodiments, the databases 108 may include a configuration management database (CMDB) that may store the data concerning CIs 110 mentioned above along with data related to various IT assets that may be present within the network 112. In addition to the databases 108, the platform 104 may include one or more other database servers. The database servers are configured to store, manage, or otherwise provide data for delivering services to the client 102 over the communication channel 106. The database server may include one or more additional databases that are accessible by the application server 107, the client 102, and/or other devices external to the additional databases. By way of example, the additional databases may include a relational database and/or a time series database. The additional databases may be implemented and/or managed using any suitable implementations, such as a relational database management system (RDBMS), a time series database management system, an object database, an extensible markup language (XML) database, a configuration management database (CMDB), a management information base (MIB), one or more flat files, and/or or other suitable non-transient storage structures. In some embodiments, more than a single database server may be utilized. Furthermore, in some embodiments, the platform 104 may have access to one or more databases external to the platform 104 entirely.

In the depicted topology, access to the CIs 110 from the platform 104 is enabled via a management, instrumentation, and discovery (MID) server 126 via an External Communications Channel Queue 128. The MID server 126 may include an application program (e.g., Java application) that runs as a service (e.g., Windows service or UNIX daemon) that facilitates communication and movement of data between the platform 104 and external applications, data sources, and/or services. The MID service 126 may be executed using a computing device (e.g., server or computer) on the network 112 that communicates with the platform 104. As discussed below, the MID server 126 may periodically or intermittently use discovery probes to determine information on devices connected to the network 112 and return the probe results back to the platform 104. In the illustrated embodiment, the MID server 126 is located inside the network 112 thereby alleviating the use of a firewall in communication between the CIs 110 and the MID server 126. However, in some embodiments, a secure tunnel may be generated between a MID server 126 running in the platform 104 that communicates with a border gateway device of the network 112.

The communication channel 128 may be a database table that is typically queried, updated, and inserted into by other systems. Each record in the communication channel queue 128 is a message from an instance in the platform 104 to a system (e.g., MID server 126) external to the platform 104 that connects to the platform 104 or a specific instance 130 running in the platform 104 or a message to the instance from the external system. The fields of a communication channel queue 128 record include various data about the external system or the message in the record.

Although the system 100 is described as having the application servers 107, the databases 108, the communication channel queue 128, the MID server 126, and the like, it should be noted that the embodiments disclosed herein are not limited to the components described as being part of the system 100. Indeed, the components depicted in FIG. 1 are merely provided as example components and the system 100 should not be limited to the components described herein. Instead, it should be noted that other types of server systems (or computer systems in general) may communicate with the platform 104 in addition to the MID server 126 and/or may be used to implement the present approach.

Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the platform 104.

In addition, other methods for populating the databases 108 may include directly importing the CIs or other entries from an external source, manual import by users entering CIs or other entries via a user interface, and the like. Moreover, although the details discussed above are provided with reference to the CMDB, it should be understood that the embodiments described herein should not be limited to being performed with the CMDB. Instead, the present systems and techniques described herein may be implemented with any suitable database.

Figure 2:
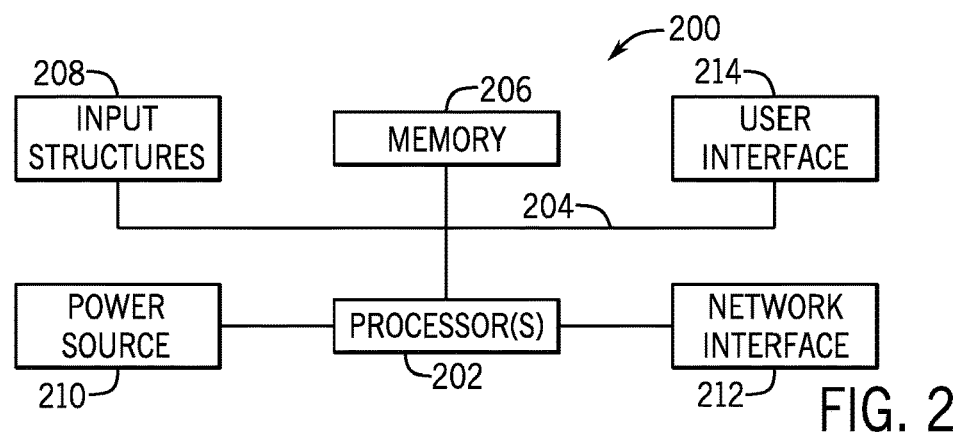
FIG. 2 is a block diagram of a computing device utilized in the distributed computing system of FIG. 1, in accordance with an embodiment.

In any case, to perform one or more of the operations described herein, the client 102, the application servicer 107, the MID server 126, and other server or computing system described herein may include one or more of the computer components depicted in FIG. 2. FIG. 2 generally illustrates a block diagram of example components of a computing device 200 and their potential interconnections or communication paths, such as along one or more busses. As briefly mentioned above, the computing device 200 may be an embodiment of the client 102, the application server 107, a database server (e.g., databases 108), other servers or processor-based hardware devices present in the platform 104 (e.g., server hosting the communication channel queue 128), a device running the MID server 126, and/or any of the CIs. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include processors capable of performing instructions stored in the memory 206. For example, the one or more processors may include microprocessors, system on a chips (SoCs), or any other suitable circuitry for performing functions by executing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), Wi-Fi, infrared, and/or other suitable protocols.

A user interface 214 may include a display that is configured to display images transferred to it from the one or more processors 202. The display may include a liquid crystal display (LCD), a cathode-ray tube (CRT), a light emitting diode (LED) display, an organic light emitting diode display (OLED), or other suitable display. In addition and/or alternative to the display, the user interface 214 may include other devices for interfacing with a user. For example, the user interface 214 may include lights (e.g., LEDs), speakers, and the like.

Analyst Landing Page

Figure 3:
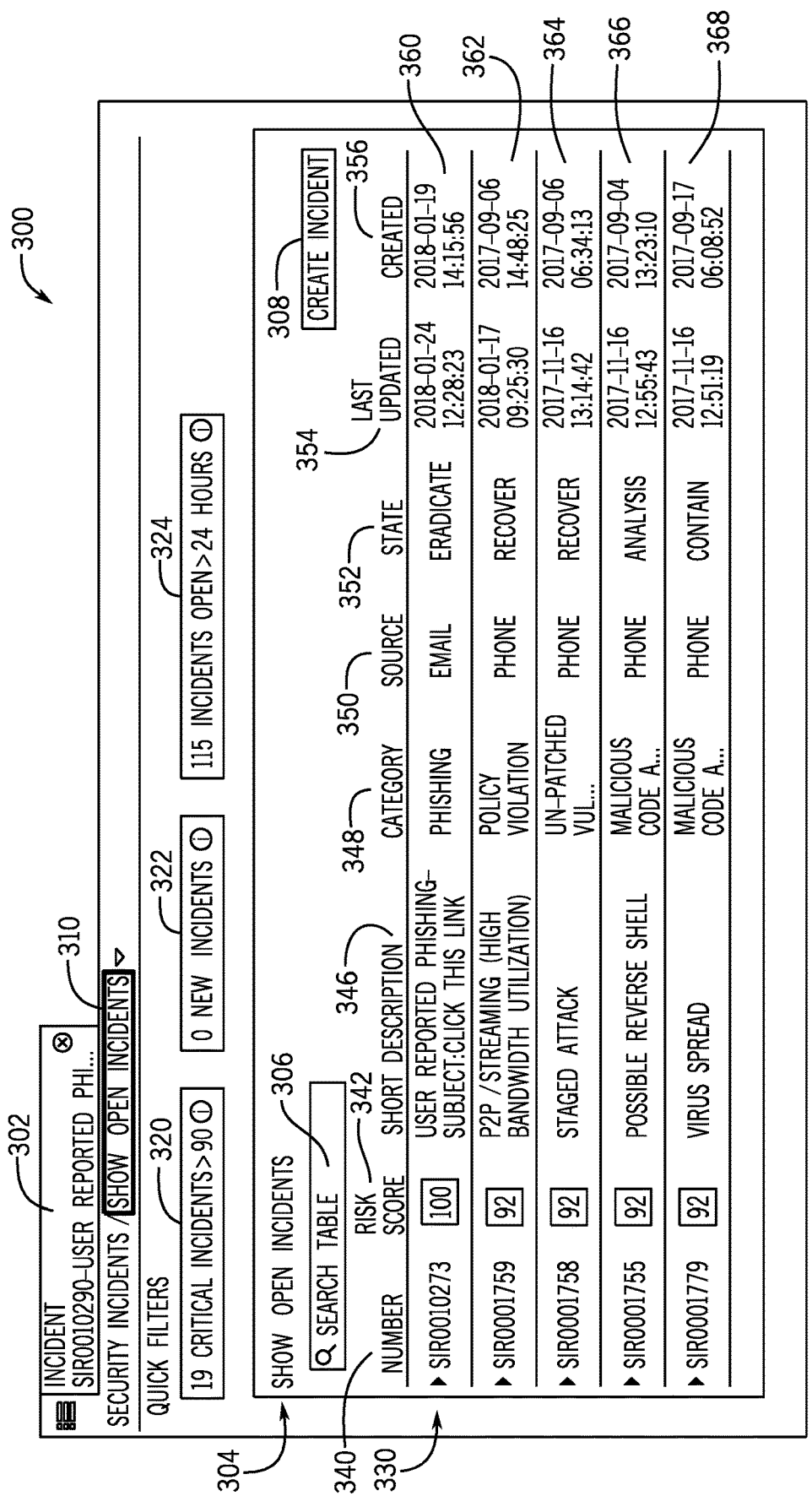
FIG. 3 is an illustration of a graphical-user-interface (GUI) for facilitating the navigation and organization of data associated with one or more security incidents on a landing page, in accordance with an embodiment.

The discussion now turns to a mechanism for displaying (e.g., rendering) data associated with one or more incidents (e.g., security incidents) and enabling interactivity with the data to analyze and resolve the incidents in a timely manner. FIG. 3 is an illustration of a graphical-user-interface (GUI) 300 for facilitating the navigation and organization of data associated with one or more security incidents 360, 362, 364, 366, 368 on a landing page 300. As used herein, a "landing page" refers to a graphical user interface (GUI) screen on which data is visualized within containers to enable interactivity with the visualized data.

Figure 4:
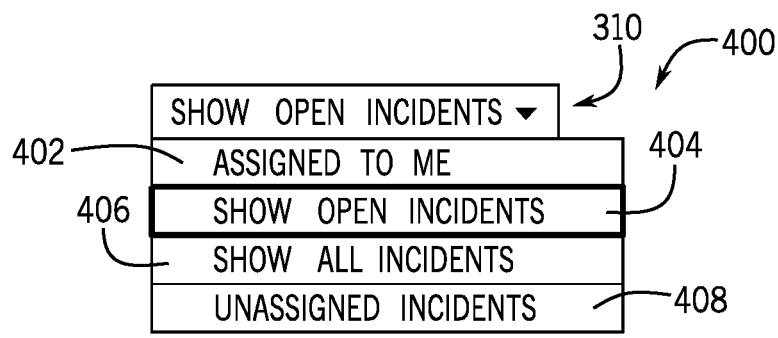
FIG. 4 is an illustration of a GUI for facilitating the display of a list of selectable filter options for the queue of security incidents on the landing page of FIG. 3, in accordance with an embodiment.

Although FIG. 3 illustrates a landing page 300 that provides a list or queue of risk score-prioritized security incidents that are open 310 (e.g., security incident that have not been resolved), it should be appreciated that the landing page may apply other filters to the visualized data or no filters to the visualized data. For example, FIG. 4 is an illustration of a GUI filter selection list 400 providing example options of a drop-down list 310 for filtering the security incident data in container 304 via selection (e.g., via left-clicking) of the corresponding option. For example, GUI 300 may display a list of security incidents assigned to a particular security analyst in container 304 via selection of the "Assigned to me" button 402 from the drop-down list 310. In another example, GUI 300 may display a list of open security incidents in container 304 via selection of the "Show Open Incidents" button 404 from the drop-down list 310. In another example, GUI 300 may display a list of all available security incidents in container 304 via selection of the "Show All Incidents" button 406 from the drop-down list 310. In another example, GUI 300 may display a list of all unassigned security incidents in container 304 via selection of the "Unassigned Incidents" button 408 from the drop-down list 310. Additionally, GUI 300 may display a list of security incidents assigned to a particular security analyst in container 304 by default. However, it should be appreciated that any of the lists of security incidents described herein may be displayed as default on landing page 300.

GUI 300 may also provide (e.g., render) one or more "quick" filter options on landing page 300 to further filter the list of security incidents displayed. For example, filter option 320 may filter the list of security incidents to only display incidents with a risk score greater than ninety via selection of the "Critical Incidents>90" button 320. In another example, filter option 322 may filter the list of security incidents to only display new security incidents via selection of the "New Incidents" button 322. New incidents may be classified as such based upon not being present in a previous view of the GUI 300, based upon not being previously viewed in the GUI 300, etc. In another example, filter option 324 may filter the list of security incidents to only display security incidents that have been open for greater than twenty-four hours via selection of the "Incidents Open>24 Hours" button 324. Additionally, each of the filter options 320, 322, 324 may indicate the number of security incidents that would be displayed in container 304 upon application of each respective filter. For example, the "Critical Incidents>90" button 320 may display the numeral "19" to indicate that there are nineteen security incidents within the "Open Incidents" filtered list that have a risk score greater than ninety. In another example, the "New Incidents" button 322 may display the numeral "0" to indicate that there are no new security incidents within the "Open Incidents" filtered list. In another example, the "Incidents Open>24 Hours" button 324 may display the numeral "115" to indicate that there are 115 security incidents that have been open greater than twenty-four hours within the "Open Incidents" filtered list.

GUI 300 may provide (e.g., render) a list or queue of security incidents 360, 362, 364, 366, 368 that illustrates the order in which security analysts should prioritize their workflow. The queue of security incidents may be sorted by risk score 342 descending, such that the security incident 360 with the highest risk score is displayed at the top of the queue while the security incident 368 with the lowest risk score is displayed at the bottom of the queue. By sorting the queue of security incidents using risk score descending, GUI 300 facilitates the resolution of the security incident with the greatest threat to its environment first. As used herein, the term "resolution" refers to bringing a security incident to closure.

Calculation of the risk score for each security incident may be based on a set of pre-defined characteristics of the data associated with each security incident. However, in some embodiments, it may be desirable to change these characteristics to fit the preferences of a user or an organization. Accordingly, these characteristics may be fully or partially customizable in calculating the risk score.

In addition to a risk score column 342, GUI 300 may display other categories of data relevant to a particular security incident in container 304. For example, an identification number column 340, a short description column 346, a category column 348, a source column 350, a state column 352, and/or the time of creation column 356 may each provide corresponding data associated with one or more security incidents in container 304.

An identification number 340 of a security incident may be a computer-generated number or may be manually entered by a user. A category 348 of a security incident may indicate the type of threat the security incident relates to, such as phishing, confidential personal identity data exposure, criminal activity/investigation, denial of service, Digital Millennium Copyright Act (DMCA) violation, equipment loss, malicious code activity, no incident, policy violation, privilege escalation, reconnaissance activity, rogue server or service, spam source, un-patched vulnerability, unauthorized access, web/BBS defacement, or shared intelligence. Other categories of security incidents may also be created and defined and/or existing categories of security incidents may be customized by a user of the GUI 300.

Figure 5:
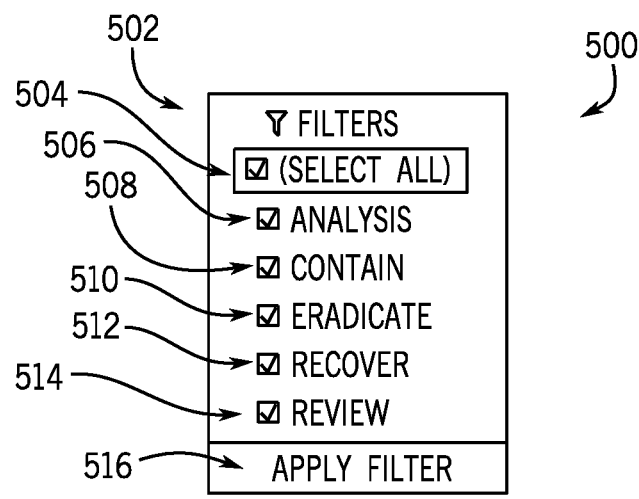
FIG. 5 is an illustration of a GUI for facilitating the display of a list of filter options for the queue of security incidents based on the state of an incident, in accordance with an embodiment.

A source 350 of a security incident may indicate, for example, the device, communication, or file that a particular security incident is associated with. For example, such sources may include an email or a mobile or other electronic device. A state 352 of a security incident may indicate the current stage of a workflow, as further described herein, that a security analyst is applying with regard to the security incident. By selecting the state category 352 (e.g., via a left-button click of the heading 352), GUI 500 as illustrated in FIG. 5 may display a drop-down list 502 of one or more filter options for the queue of security incidents on landing page 300. For example, GUI 500 may display filter options Analysis 506, Contain 508, Eradicate 510, Recover 512, and Review 514, which correspond to each stage within a particular security incident workflow. GUI 500 may also include a "Select All" option 504 to select every displayed filter option. Additionally, the GUI may provide an "Apply Filter" button 516 to apply any filters selected in the drop-down list 502 to the list of security incidents in container 304. For example, if every filter option is selected, the list of security incidents may include all open security incidents currently in any stage of a particular workflow. In another example, if only the Analysis filter option 506 is selected, the list of security incidents may include only the security incidents that are currently within the Analysis state of the workflow. GUI 500 may also indicate whether a respective state filter is selected by displaying a checked box, a solid filled box, or any other graphic that may indicate that the particular filter option is selected.

Returning to FIG. 3, a time of creation 356 of a security incident may indicate the time and/or date a security incident was created. For example, a user of the GUI (e.g., via selection of the "Create Incident" button on dashboard 300) may manually input data related to a particular security incident from, for example, a service catalogue or a suspicious email. In another example, the security incident may be automatically created from, for example, an alert sent by an automated security system (e.g., a firewall) to the database that stores the security incident data. The time of creation 356 for a respective security incident may indicate the time and/or the date the security incident was created. The time of creation 356 may be represented by hours, minutes, and/or seconds, and the date may be represented by days, months, and/or years. Additionally, the time and/or date may be represented numerically, graphically, and/or textually.

The queue of security incidents 360, 362, 364, 366, 368 may also be filtered via a text search 306. For example, the term "virus" may be entered into text search 306, resulting in any security incidents (e.g., 368) with the term "virus" being displayed in the list of security incidents in container 304.

As illustrated in FIG. 6, GUI 600 may display a peek view 602 of each security incident in container 304 upon selecting (e.g., via left-clicking) the graphic 330 next to the identification number 340 of each security incident (e.g., in the queue of FIG. 3). For example, the graphic 330 may be a right-facing arrow changes to a downward-facing arrow upon selection to indicate that the peek view 602 of a respective security incident is being displayed in container 304. The peek view 602 may include additional visualizations of the data associated with a particular security incident. For example, the peek view 602 may provide a full description of a security incident, a rendering of some or all the information in an attachment associated with the security incident, the name or identification number of the security analyst that the security incident is assigned to, the assignment group the security analyst belongs to within an organization, a business impact rating, or a priority rating. In some embodiments, the data visualized via the peek view 602 may be customized by a user of the GUI to display more, less, or different characteristics of a particular security incident than the characteristics displayed in FIG. 6.

Security Incident Dashboards

Through selection (e.g., via left-clicking) of the "Open Incident Tab" 604 in peek view 602 of a particular security incident (e.g., security incident 360), GUI 700 may display a dashboard 302 for the security incident. As used herein, a "dashboard" refers to GUI screen on which data-driven widgets may be placed in pre-defined containers to enable interactivity with the data displayed. The widgets may be independent data-driven software that perform particular tasks. For example, the widgets may provide visualizations generated based upon data associated with a particular security incident.

Figure 7:
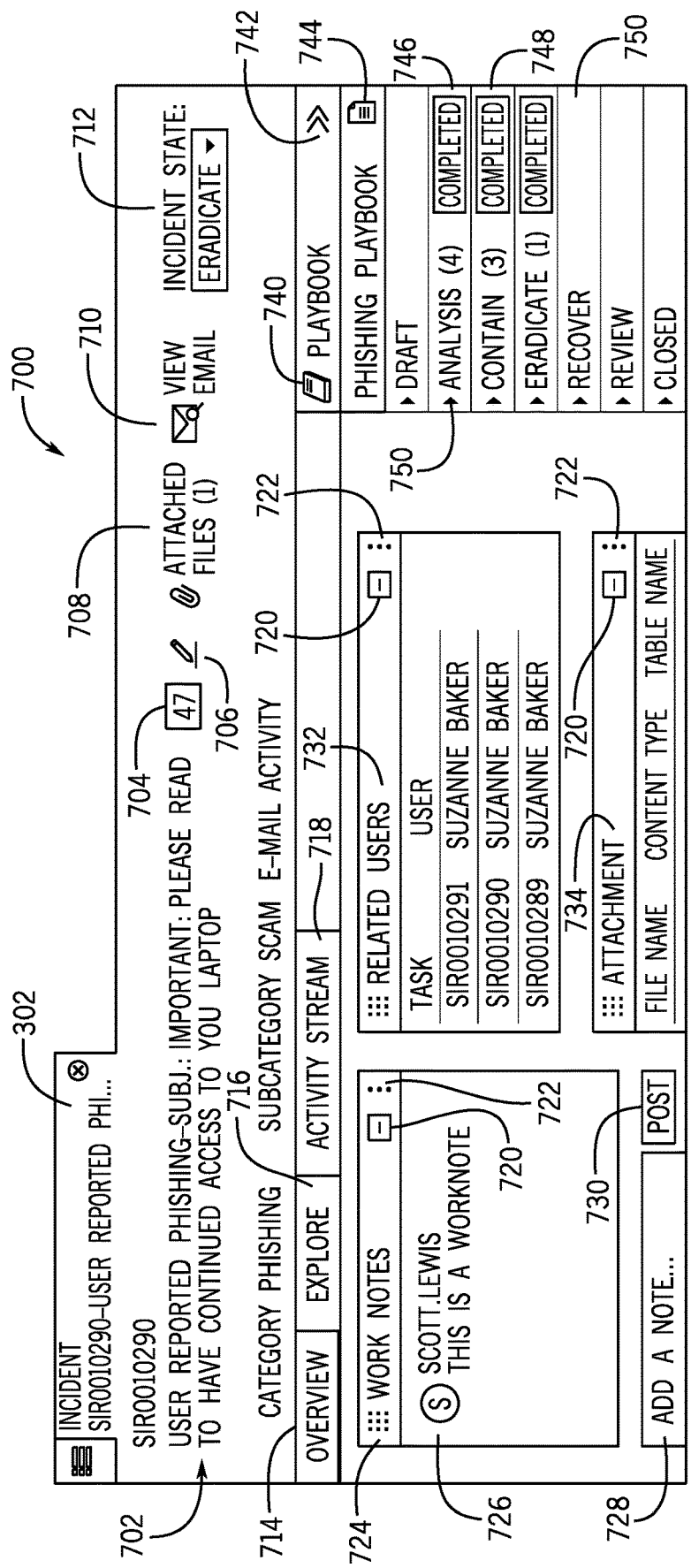
FIG. 7 is an illustration of a GUI for facilitating the navigation and organization of data associated with a particular security incident on a dashboard via the Overview container and the Playbook, in accordance with an embodiment.

FIG. 7 is an illustration of a GUI 700 for facilitating the navigation and organization of data associated with a particular security incident on dashboard 302. Although GUI 700 displays only a single dashboard 302, it should be appreciated that multiple dashboards corresponding to a respective security incident may be displayed by GUI 700.

For example, when GUI 700 displays data associated with security incident 360 on dashboard 302, the data associated with security incidents 362, 364 visualized on corresponding dashboards will not concurrently be displayed by GUI 700 in the same manner. However, an upper tab 302 of each "hidden" dashboard may display a portion of information related to a corresponding security incident when the body of each "hidden" dashboard is not displayed. For example, the upper tab 302 of dashboard 302 may display an identification number and a short description of the security incident regardless of whether the body of dashboard 302 is displayed. Thus, GUI 700 may facilitate a selective display of data associated with a particular security incident by selecting the corresponding tab of each security incident. Upon non-selection, GUI 700 may render the upper tab of each "hidden" dashboard with a different color or pattern than the upper tab 302 of a dashboard 302 that is displayed in full.

Security incident dashboard 302 may have a header container 702 for displaying information associated with a particular security incident. For example, the header container 702 may display the identification number of the security incident, the short description of the security incident, the category and sub-category associated with the security incident, the risk score 704 of the security incident, and a state indicator 712 of the security incident. The header 702 may also display several graphical icons 706, 708, 710 that perform particular tasks upon selection. For example, by selecting (e.g., via left-clicking) graphical icon 706, information fields associated with a particular security incident may be edited. These fields of information may include the identification number of the security incident, the short description of the security incident, and/or the category and sub-category of the security incident.

Figure 13:
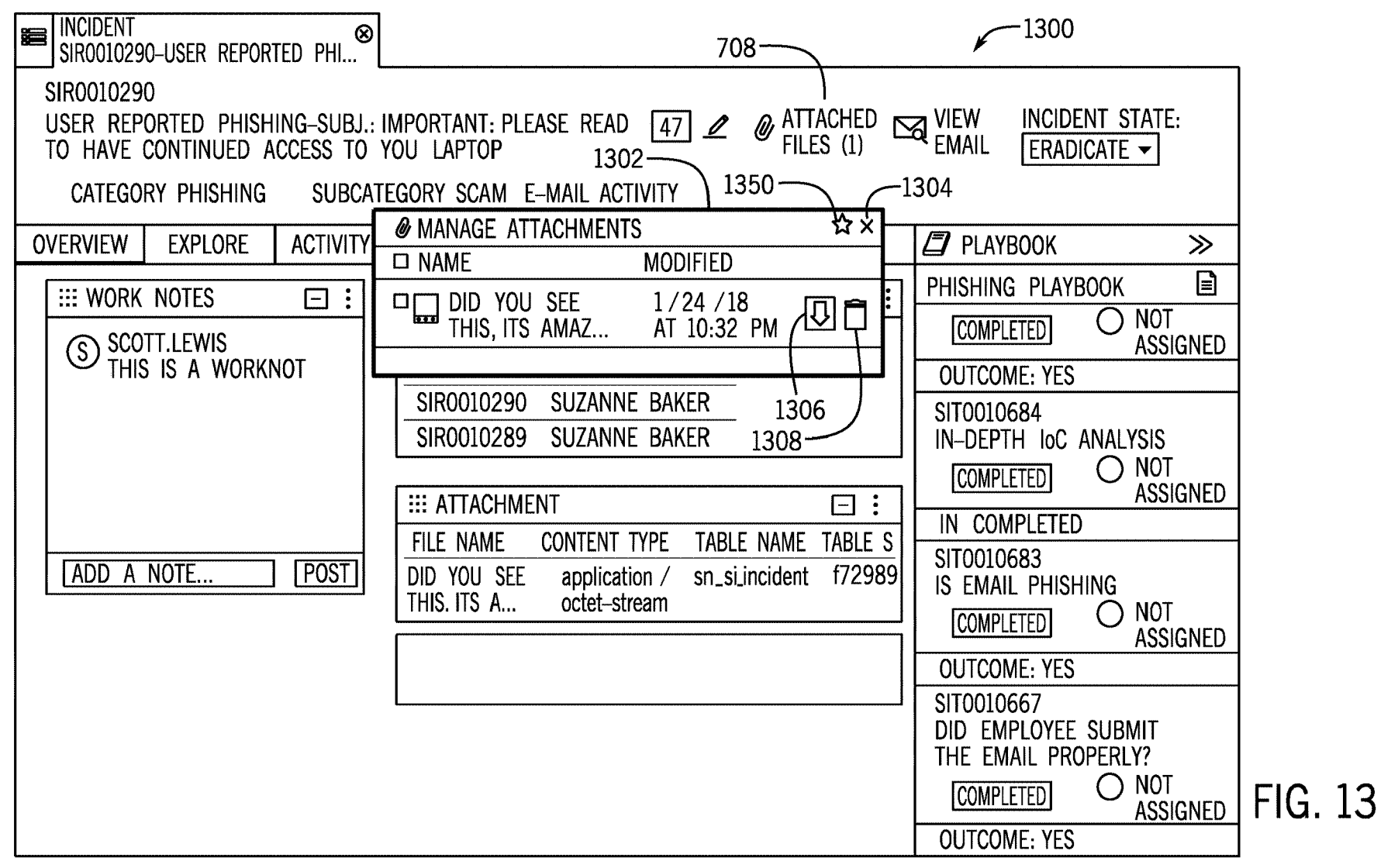

In another example, by selecting "Attached Files" graphical icon 708, GUI 1300 may display a container 1302 for managing any attachments associated with the security incident as illustrated in FIG. 13. GUI 1300 may display a list of the attachments in container 1302. GUI 1300 may also display data associated with the attachments, such as the name of the attachment and the time and date the attached file was created or modified. GUI 1300 may also provide selectable options for downloading and/or deleting the file. For example, by selecting (e.g., via left-clicking) download graphic 1306, a user may download the attached file, or by selecting delete graphic 1308, a user may delete the attached file from a database. A preference icon 1350 displayed in container 1302 may be selected or de-selected by a user to reproduce the container 1302 as a widget 734 in the "Overview" container described herein. Graphic 708 may also indicate the number of attachments associated with the security incident and displayed via GUI 1300. For example, GUI 700, 1300 may display a numeral corresponding to the number of accessible attachments.

Returning to FIG. 7, by selecting "View email" graphical icon 710, GUI 1500 may display a rendering 1524 of the email in the "Explore" container 716. This is described in more detail below, with regard to FIG. 15.

Overview Container

As illustrated in FIG. 7, GUI 700 may also facilitate the display of containers 714, 716, 718 by providing different visualizations of data associated with a respective security incident. The containers 714, 716, and 718 provide quick and efficient access to particularly relevant incident response data for personas with different experience levels. This provides additional incident response efficiencies, never before seen, which facilitates rapid response to incidents.

Figure 8:
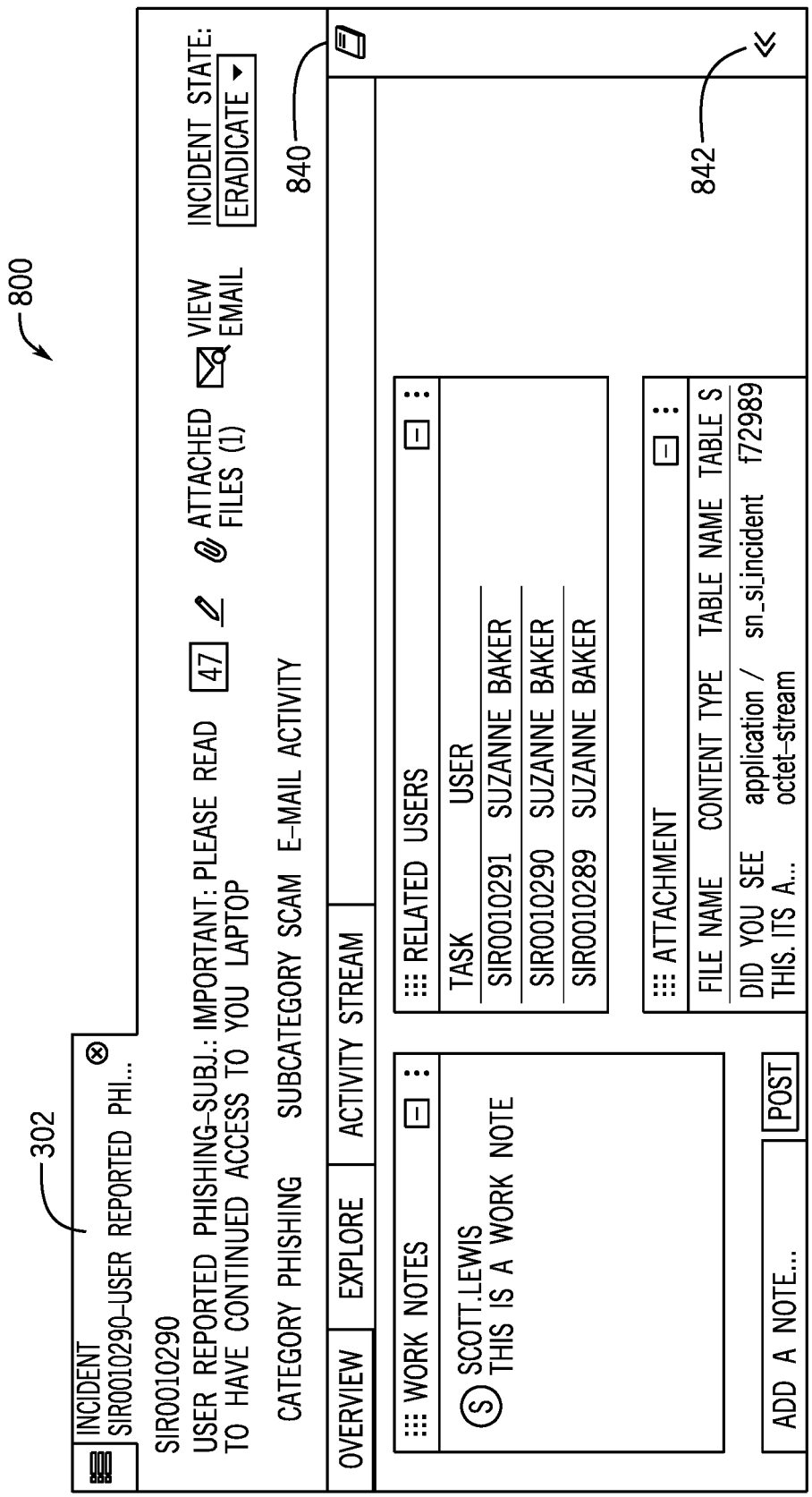
FIG. 8 is an illustration of a GUI for facilitating the navigation and organization of data associated with a particular security incident on a dashboard via the Overview container, in accordance with an embodiment.

The "Overview" container 714 may provide information considered most important to a security analyst via selection of preference icons (e.g., 1350, 1950, 2150) in containers and/or widgets displayed by the graphical user interface. GUI 700 may display the widgets corresponding to the selected preference icons in container 714. The "Explore" container 716 may provide a set of lists of data associated with a particular security incident that a user has access to, as described herein. The "Activity Stream" container 718 may provide an audit trail of all user-made and/or machine-made actions with regard to a particular security incident as described herein. GUI 700 may facilitate a selective display of each container 714, 716, 718 by selecting (e.g., via left-clicking) the header of the desired container to be viewed. For example, by selecting the header of the "Overview" container 714, the body of the "Overview" container 714 is displayed while the bodies of the "Explore" container 716 and the "Activity Stream" container 718 are hidden as illustrated in FIGS. 7 and 8.

In some embodiments, it may be desirable to maintain a standard arrangement of data visualized in the "Overview" container 714 for all security incidents within a particular category and/or sub-category of security incident. Accordingly, the default arrangement of the "Overview" container 714 may be dependent on the particular category and/or sub-category associated with a particular security incident. For example, the types of widgets displayed by the "Overview" container 714 may be the same for each security incident in the "Phishing" category and/or in a "Scam e-mail activity" sub-category. In some embodiments, it may be desirable to enable a customizable arrangement of data visualized in the "Overview" container 714 tailored to the preferences of a user or a security analyst. For example, the default arrangement of widgets displayed in the "Overview" container 714 may be defined to appear the same across all security incidents assigned to a particular security analyst.

Figure 19:
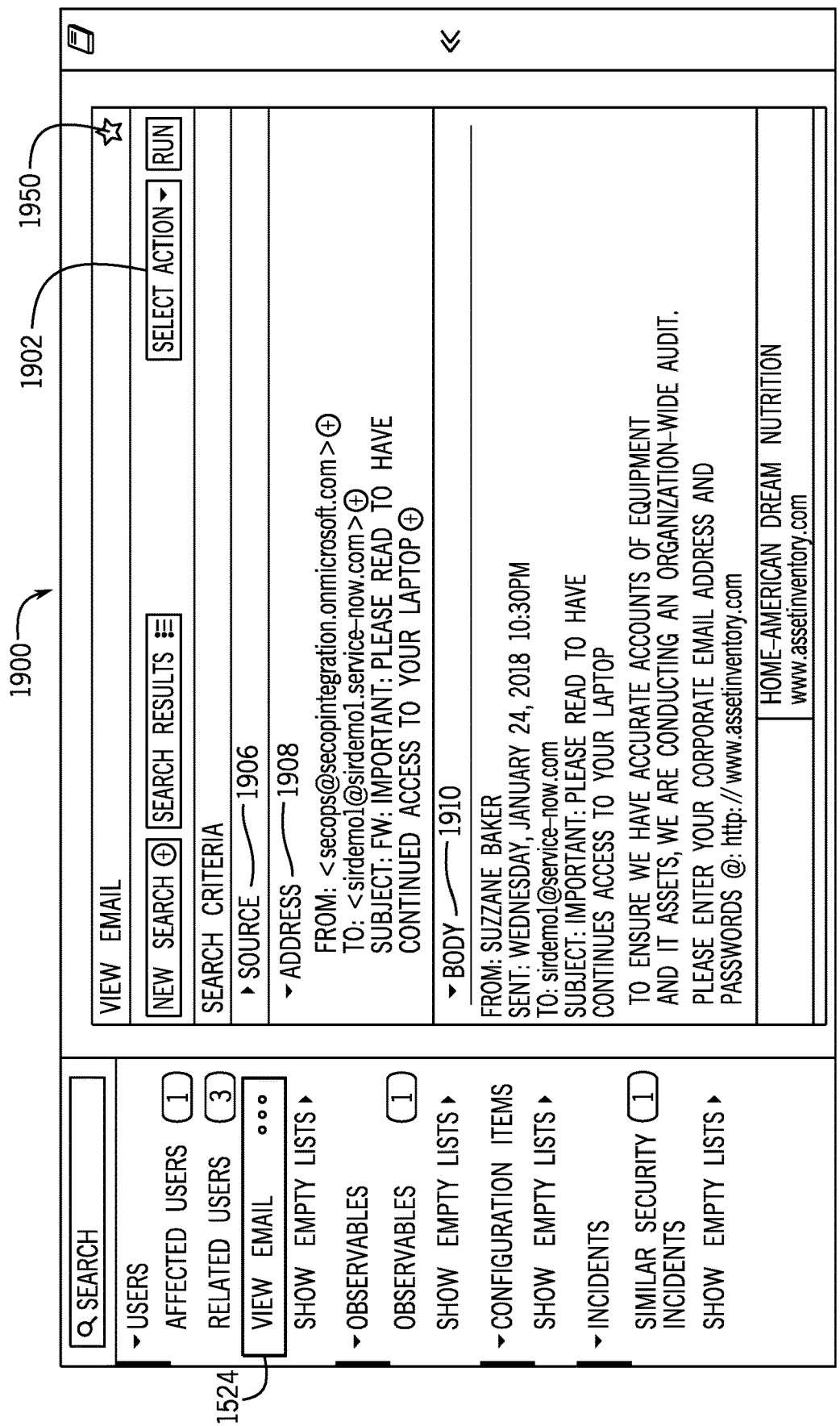
FIG. 19 is an illustration of a GUI facilitating the rendering of an email associated with a particular security incident, in accordance with an embodiment.
Figure 21:
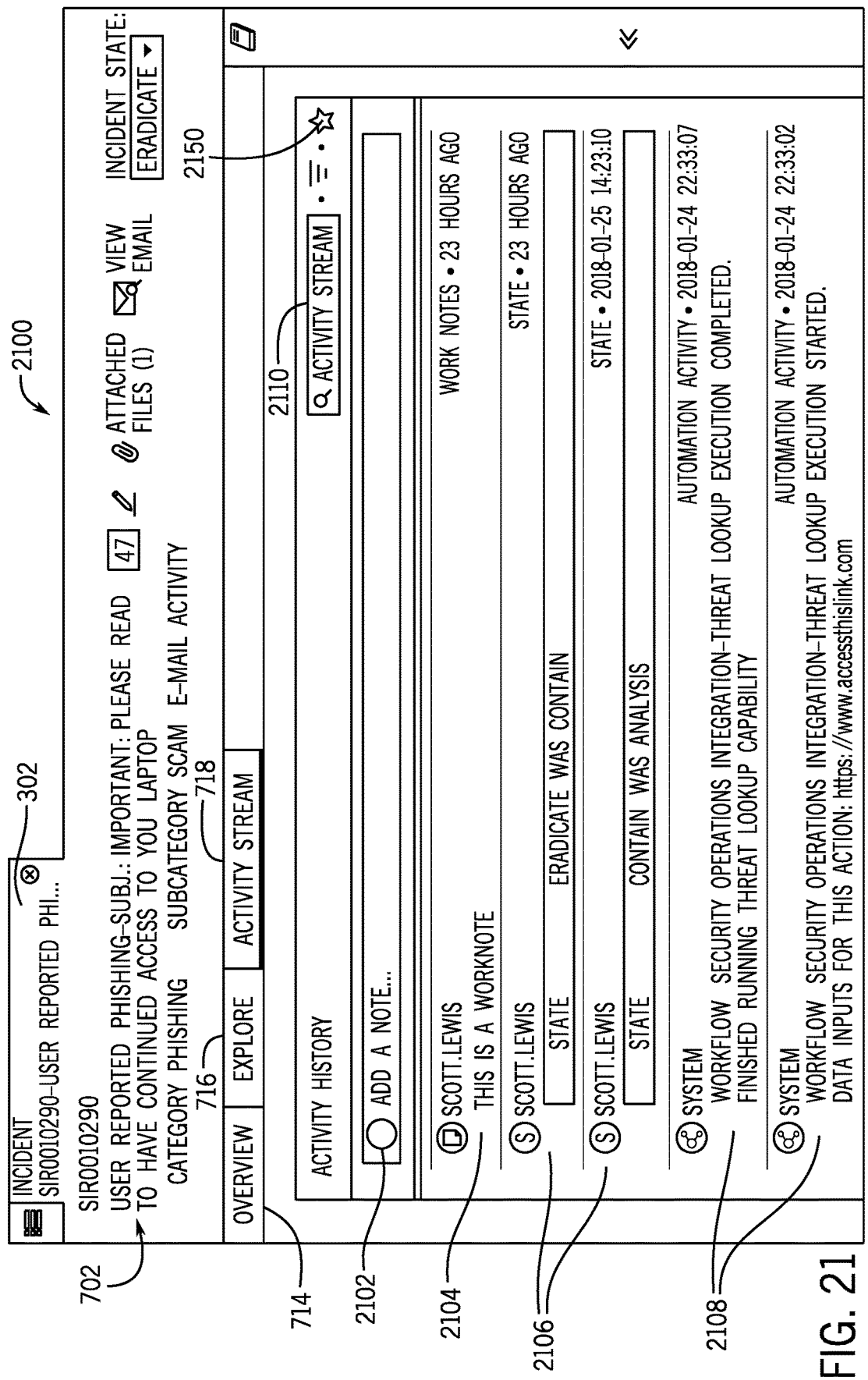
FIG. 21 is an illustration of a GUI for facilitating displaying and navigating a history of the actions taken with a respective security incident.

Widgets 724, 732, 734 may be independent data-driven software that perform particular tasks. For example, the widgets 724, 732, 734 may provide visualizations generated based upon data associated with a particular security incident. As described above, the types of widgets that may be displayed in "Overview" container 714 may be controlled by selecting or de-selecting (e.g., via left-clicking) an icon (e.g., star 1350, 1950, 2150) in the header of containers or the header of widgets displayed in, for example, GUIs 1300, 1900, 2100 as illustrated in FIGS. 13, 19, and 21. For example, after selecting preference icon 1350, the corresponding widget 734 will be displayed in "Overview" container. In another example, after de-selecting preference icon 1350, the corresponding widget 734 will not be displayed in "Overview" container. It should be appreciated that the selectable graphic may be present in any visualization of data displayed via the graphical user interface described herein. Further, a default set of widgets may be displayed in "Overview" container 714. The default set of widgets may be based on the category and/or sub-category of a particular incident. For example, the default set of widgets displayed in "Overview" container 714 may be the same set of widgets for all incidents within the "Phishing" category of incidents.

In some embodiments, it may be desirable to enable customized positioning and/or sizing of widgets 724, 732, 734. Accordingly, GUI 700 may provide such features for each of the widgets. In other words, for each incident dashboard 302 on GUI 700, the widgets may be dynamically moved (e.g., dragging a portion of a header of the widget) to any location within "Overview" container 714 of incident dashboard 302 without being constrained to pre-defined locations. Further, the size of the widgets 724, 732, 734 may be dynamically altered in the GUI 700 by selecting size button 720 (e.g. via left-clicking). The body of widgets 724, 732, 734 may be expanded or minimized by selecting size button 720 until the desired size is displayed. In some embodiments, when the body of the widgets is minimized, at least a portion of the data visualized by the widgets may be hidden from view. In some embodiments, when the body of the widgets is expanded, the widgets may display additional visualized data that may have been hidden from view in the widgets' non-expanded view. GUI 700 may display a list of additional options regarding a respective widget upon selecting (e.g., via left-clicking) graphic 722. These options may include an option to delete the widget, an option to expand the widget, and/or an option to edit the particular information fields associated with the widget.

"Work Notes" widget 724 may list any text 726 entered by a security analyst through text box 728 or text box 2102 and selecting the "Post" button 730. Work Notes widget 724 may also display other data associated with the text entry 726. For example, Work Notes widget 724 may display a user graphic identifier, a user identifier, and/or how long ago the text was entered. Work Notes widget 724 may help facilitate security analysts in catching up on any progress made to resolve the security incident or provide an area to note any information deemed relevant by a security analyst. In this way, the resolution of a security incident would not be as hindered or delayed after a change in an assignment of security analysts to the security incident. The information provided in Work Notes widget 724 may help a subsequently assigned security analyst get up to speed on any progress made on the security incident.

"Related Users" widget 732 may list particular users associated with other security incidents that are related to the displayed security incident. For example, the source of a security incident reported by a user may be a suspicious email, and any other security incidents which involve the same user or same email may be displayed. Related Users widget 732 may also list a portion of the data associated with each respective security incident. For example, Related Users widget may list an identification number for each related security incident and the name of the particular user associated with the related security incident. The list of security incidents may include security incidents from the security incident queue described herein or from archived security incidents in a database 108.

Attachment widget 734 may display a list of attachments associated with the security incident. Attachment widget 734 may also display data associated with the attachments. For example, attachment widget 734 may display the name of the attached file, the content type of the attached file, and the table name of the attached file.

Playbook

As discussed above, a variety of personas with different experience levels may utilize the dashboard 700. For less-experienced personas, incident response may be difficult, as there may be a significant number of incident types, numerous variations of incidents of a certain type, etc. Accordingly, an incident playbook may be provided by the dashboard to facilitate efficient incident response by lesser-experienced personas. The incident playbook may provide an intuitive, guided experience in the resolution of any particular security incident. As such, the incident playbook may minimize oversight by supervising or more-experienced personas who would otherwise be required to teach or provide a tutorial to less-experienced personas for each type of security incident.

As illustrated in FIG. 7, GUI 700 may also provide (e.g., render) a "Playbook" widget 740 for guiding a security analyst through a workflow for resolving a particular security incident. The Playbook widget 740 may facilitate guiding a security analyst (e.g., a junior analyst) who may not possess the knowledge to resolve a particular security incident. In some embodiments, it may be desirable to hide or minimize the Playbook widget's appearance in GUI 700 for security analysts who do not require its use. By selecting (e.g., via left-clicking) the graphic 742, the GUI 800 may display a minimized "Playbook" widget 840 as illustrated in FIG. 8. Additionally, by selecting the graphic 842, GUI 700 may display a full view of the "Playbook" widget 740 as illustrated in FIG. 7. In some embodiments, by displaying "Playbook" widget in either its full view or minimized view may also change the dimensions of the "Overview" container 714, the "Explore" container 716, and the "Activity Stream" container 718 as illustrated, for example in FIGS. 7, 8, 15, and 21.

Figure 9:
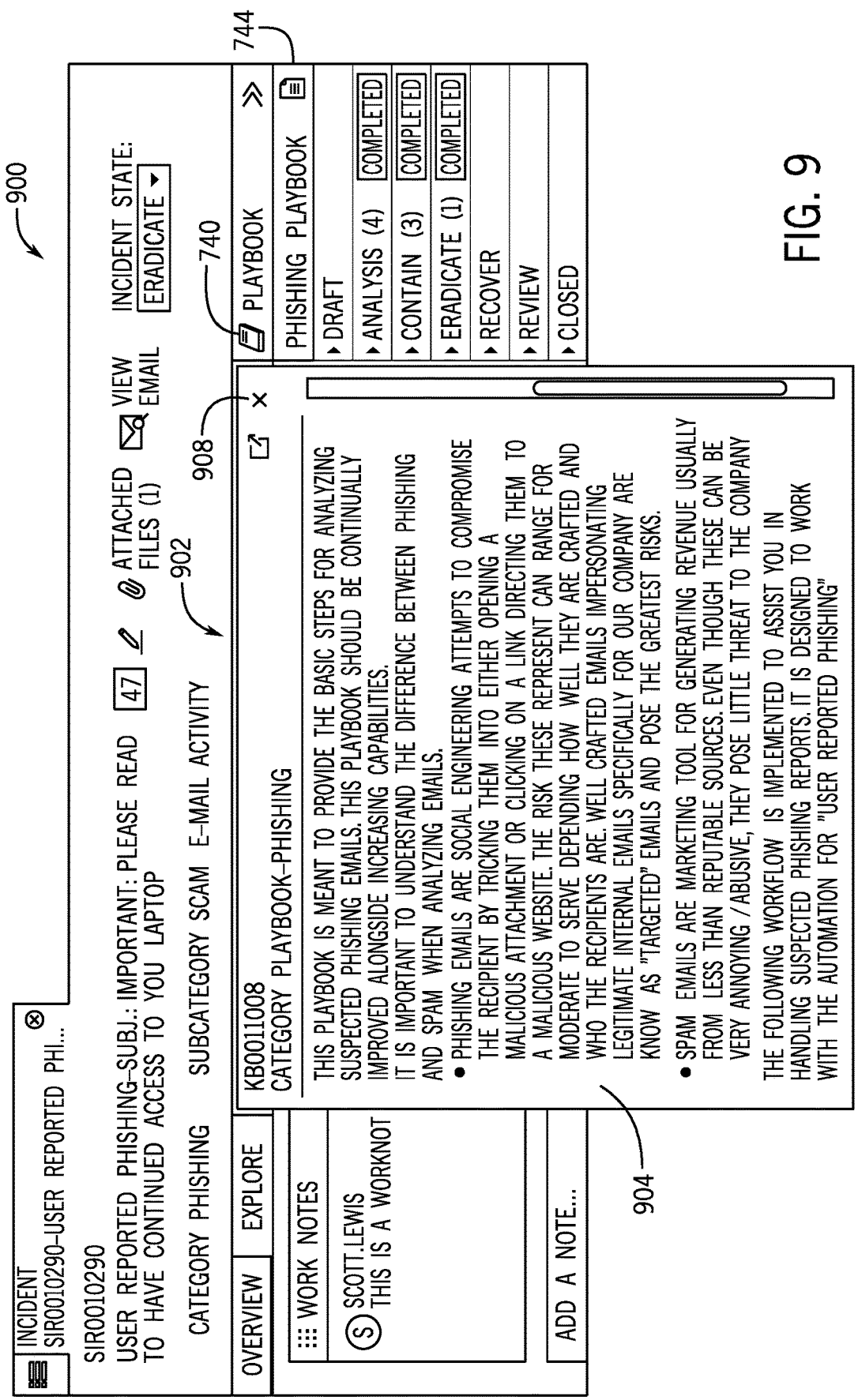
FIG. 9 is an illustration of a GUI for facilitating the display of information related to the Playbook of a particular incident, in accordance with an embodiment.
Figure 10:
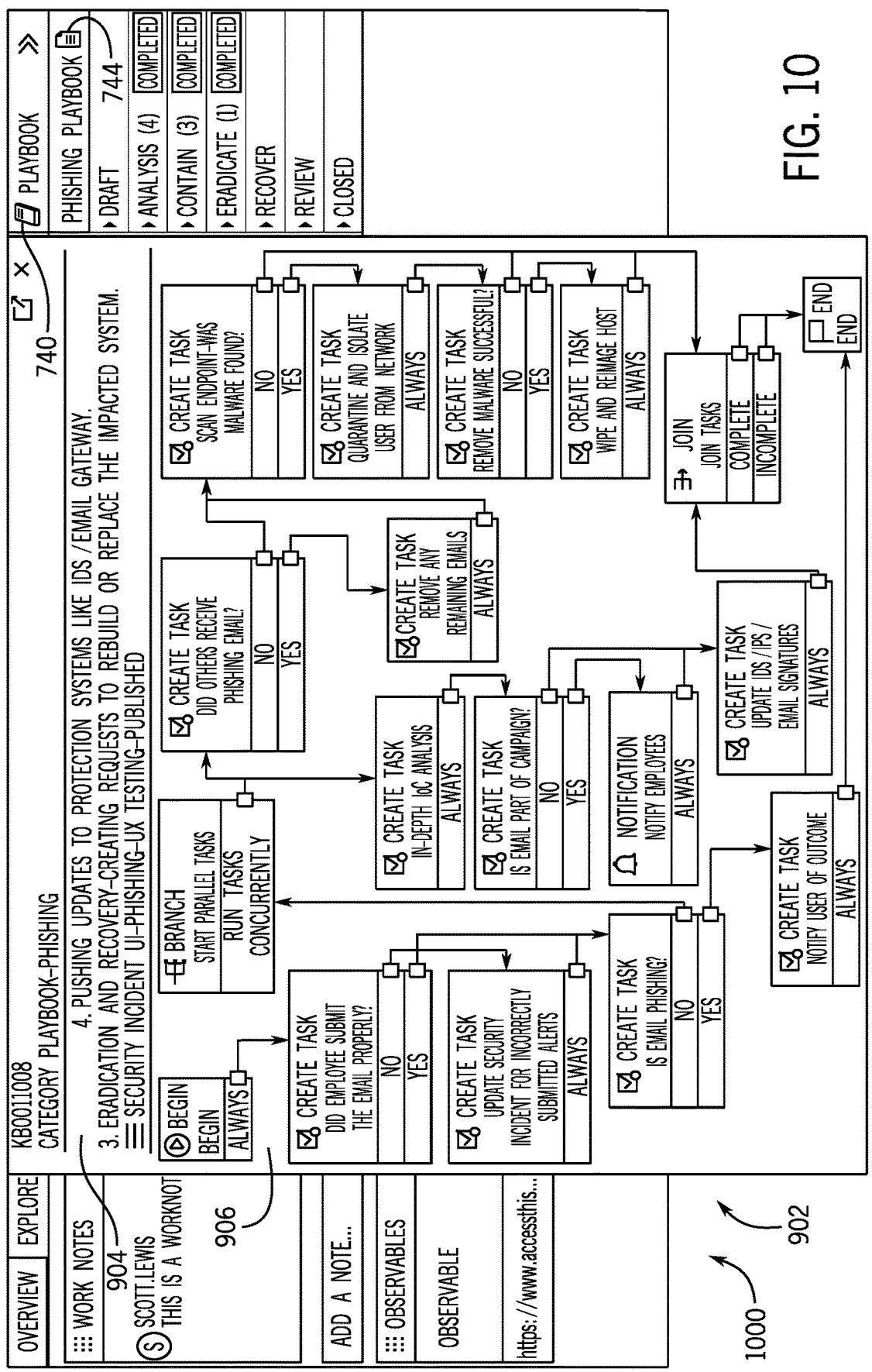
FIG. 10 is an illustration of a GUI for facilitating the display of information related to the Playbook of a particular incident, in accordance with an embodiment.

FIGS. 9 and 10 are illustrations of a GUI 900, 1000 for viewing general information related to the "Playbook" for a category and/or subcategory of a particular incident. For example, by selecting (e.g., left-clicking) document graphical icon 744 in FIG. 7, GUI 900 may display an html page 904 describing how to resolve incidents with the identified category and/or subcategory (e.g., phishing incidents and/or scam email activity in the current embodiment) and a graphical representation 906 of the corresponding workflow. The html page 904 may be fully customizable depending on a user's preferences. Additionally, GUI 900, 1000 may display several graphics 908 the header of container 902 that perform particular tasks upon selection. For example, by selecting exit graphical icon 908, container 902 is hidden from view in GUI 900.

Returning to FIG. 7, Playbook widget 740 may provide a default workflow for each type of security incident based on the category and/or sub-category of a particular security incident. For example, the Playbook widget 740 for each security incident associated with the "Phishing" category may include the same series of steps in the workflow. However, the "Playbook" widget 740 for a security incident associated with the "DMCA violation" category may include a different series of steps in the workflow. The incident states 746, 748, 750 may include default incident states within a workflow defined by the National Institute of Standards and Technology (NIST). The series of default incident states may proceed in the following order: Analysis, Contain, Eradicate, Recover, and Review. For example, the tasks within the Analysis incident state may relate to determining whether a threat exists and if a threat exists, the identity of the threat. The tasks within the Contain incident state may relate to stopping the spread of the threat to mitigate the risk associated with the threat. The tasks within the Eradicate state may relate to eliminating the threat. The tasks within the Recover incident state may relate to restoring a device or environment affected by the threat to its original state. The tasks within the Review incident state may relate to understanding the circumstances that caused the threat and/or the resulting damage and determining how to improve the resolution process in the future. As such, Playbook widget 740 may facilitate providing an organization with standard procedures in line with various regulatory compliance policies.

In some embodiments, it may be desirable for the series of incident states to be customizable according to the needs of a particular organization or company. Accordingly, the default incident states may be configurable to track other established security workflows or modified according to the preferences of a user. For example, the series of incident states may include additional incident states and/or a different order of incident states. Additionally, the workflow may change based on other characteristics of a particular security incident. For example, these characteristics may include the assigned security analyst or the assignment group of the assigned security analyst. In some embodiments, the Playbook widget may display less detail for each of the steps in the workflow as compared to the detail of steps for a junior analyst.

Figure 11:
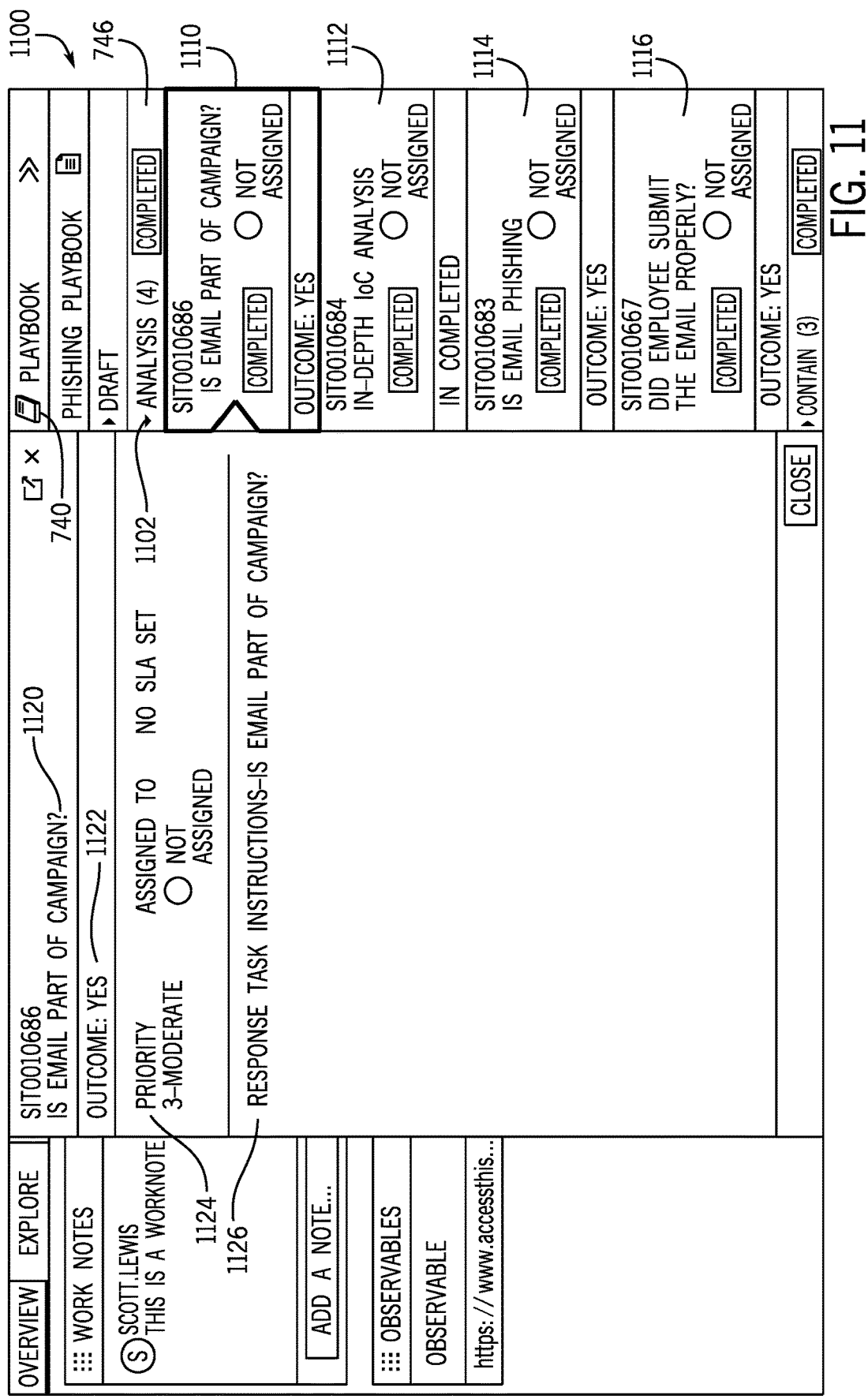
FIG. 11 is an illustration of a GUI for facilitating the display of instructions of a particular task within a state of a security incident workflow, in accordance with an embodiment.
Figure 12:
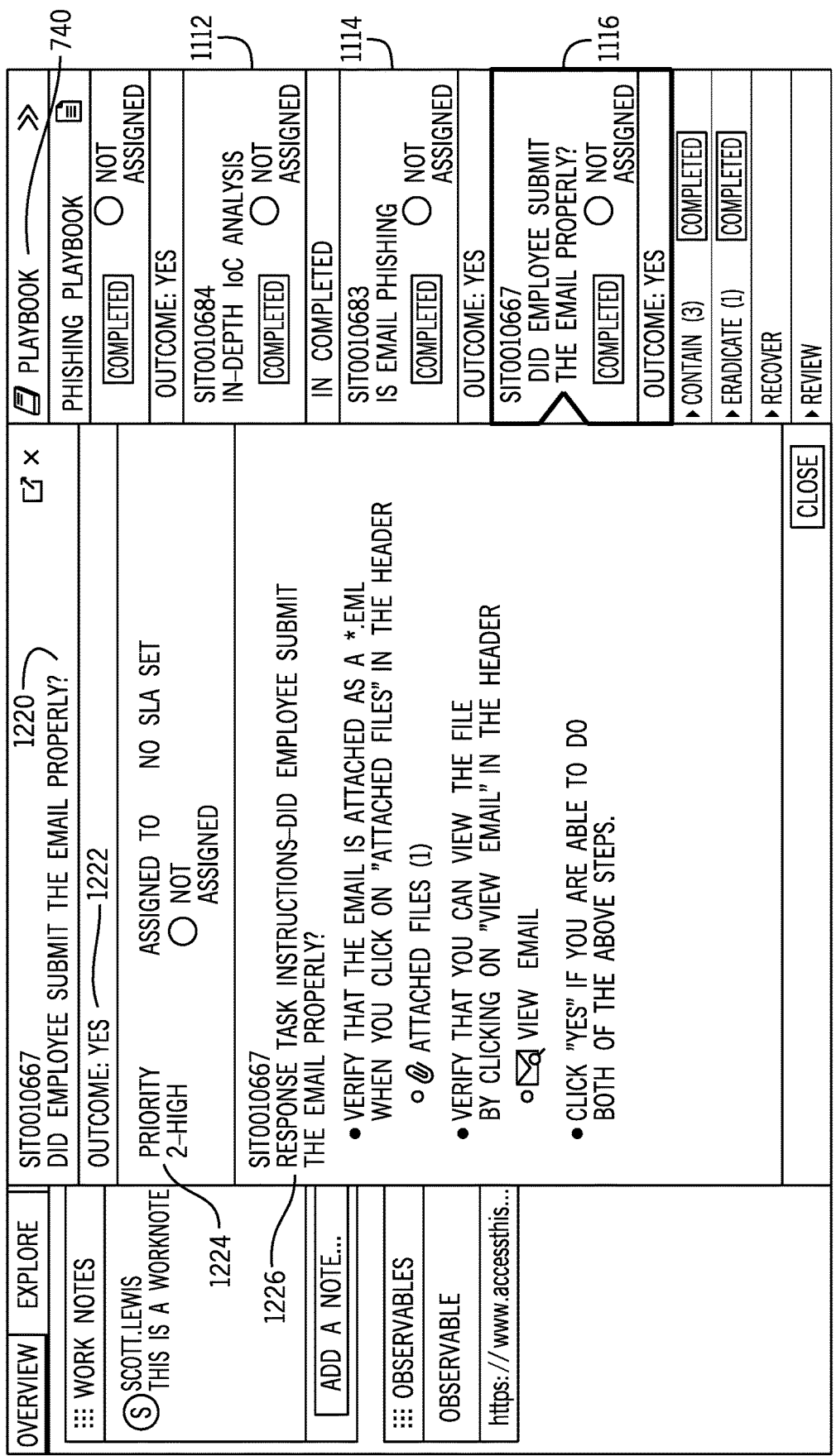
FIG. 12 is an illustration of a GUI for facilitating the display of instructions of a particular task within a state of a security incident workflow, in accordance with an embodiment.
Figure 14:
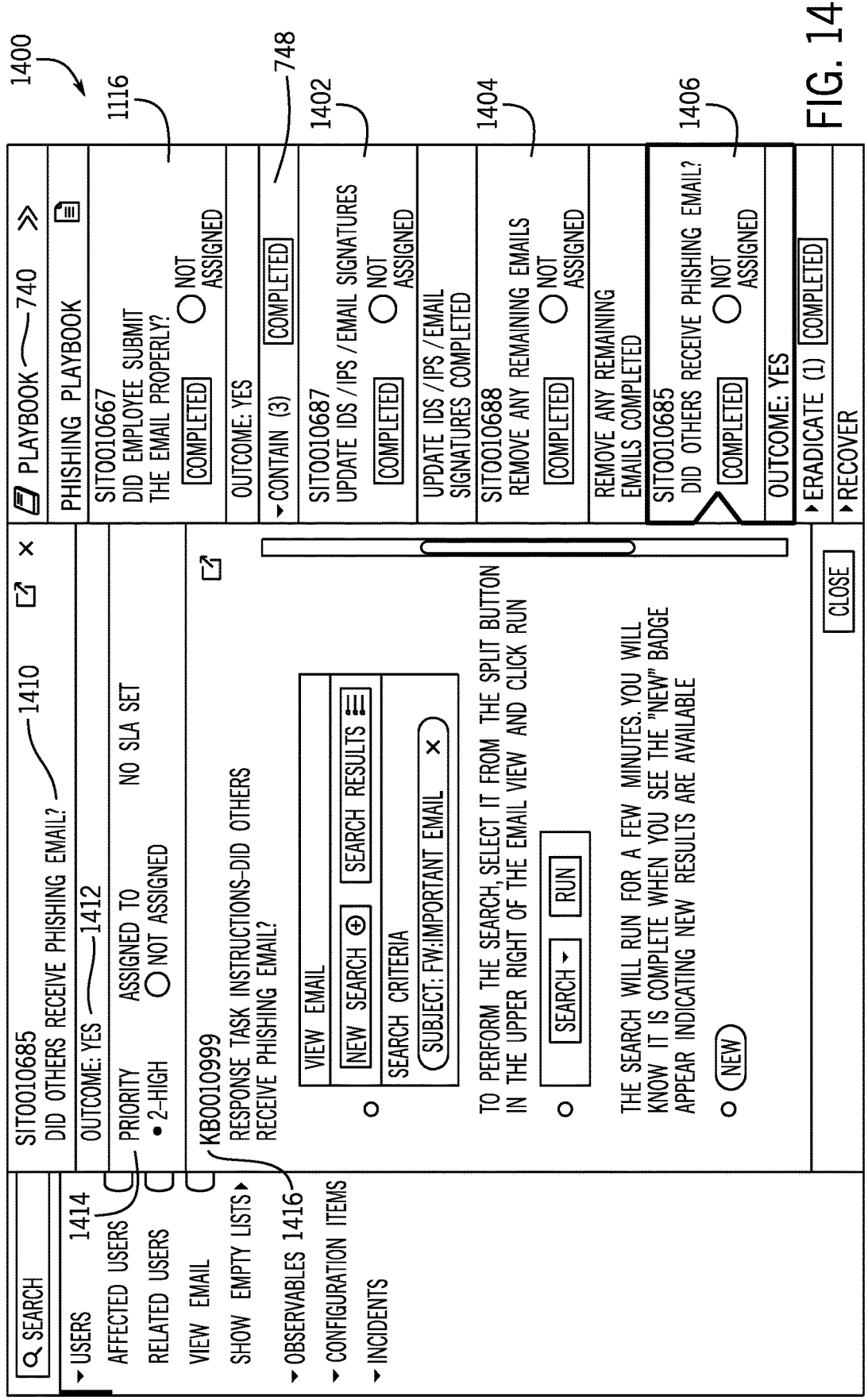
FIG. 14 is an illustration of a GUI for facilitating the display of instructions of a particular task within a state of a security incident workflow, in accordance with an embodiment.

As described above, the Playbook widget 740 may include a list of incident states 746, 748 with each incident state involving one or more tasks to be completed by a security analyst to resolve a particular security incident. By selecting (e.g., via left-clicking) the arrow graphic 750 of each incident state 746, 748, Playbook widget may display a list of one or more tasks within each incident state 746, 748 as illustrated in FIGS. 11, 12, and 14. Playbook widget 740 may also hide these tasks my selecting arrow graphic 1102 as illustrated in FIG. 11. The header 746 of each incident state 746 may also include an indicator of the number of tasks within that incident state. For example, if an incident state had four tasks within that state for a security analyst to complete, the header 746 of the incident state may display the numeral '4.' The header 746 of each incident state may also indicate whether every task within a particular incident state has been completed. For example, header 746 may display an indication that a state has been completed. The list of incident states 746, 748, 750 may also include incident states 750 that have no tasks to be completed. Playbook widget 740, for example, may disable any interactivity with these incident states 750.

Each incident state 746, 748 may include one or more tasks related to the incident state. For example, a security analyst may work through ten, twenty, fifty, or one hundred tasks in a given workflow divided among one or more incident states. By bundling and displaying tasks according to incident state, tasks may be viewed at a more manageable level, resulting in more efficient progression between states during the incident response process. FIG. 11 is an illustration of a GUI 1100 for facilitating the display of instructions 1126 for completing a particular task 1110 of an Analysis incident state 746. By selecting (e.g., via left-clicking) task 1110, GUI 1100 may display a general instruction in container 1120, a text box for inputting a response to the general instruction in container 1122, and any detailed instructions in container 1126. GUI 1100 may also display in the body of task 1110 the general instruction, a status indicator of whether the task has been completed, an assignment indicator of whether the task has been assigned in the workflow (and who the assignee is, when the task has been assigned), and/or the result of the task. In addition, a service level agreement (SLA) may also be indicated. The SLA may include an agreed upon time with which the task should be completed.

In some embodiments, the playbook 740 may accumulate information regarding the incident via tasks. For example, the task may be a question that must be answered to complete the task. Task 1110 instructs a security analyst to answer the question "Is Email Part of Campaign?" The body of container 1122 provides a text box for answering the question. If there are no additional details to the general instruction, GUI 1100 may not display any additional instructions in the container 1126. GUI 1100 may also display other characteristics related to a particular task. For example, GUI 1100 may display may display a priority indicator of the task or an assignment indicator of the task within container 1124. The priority indicator may be represented numerically, textually, graphically, or a combination thereof.

This accumulation function may increase efficiency for response personnel, as the personnel can stay on one GUI to step through incident response tasks and provide collected data, rather than having to flip between a task list page and a separate data collection page. This may result in significant time savings and may improve data collection accuracy.

FIG. 12 is an illustration of a GUI 1200 for facilitating the display of instructions 1226 for completing a different task 1116 within the Analysis incident state 746. By selecting (e.g., via left-clicking) task 1116, GUI 1200 may display a general instruction in container 1220, a text box for inputting a response to the general instruction in container 1222, and any detailed instructions in container 1226. As described above, the task may be a question that must be answered to complete the task. Task 1116 instructs a security analyst to answer the question "Did employee submit the email properly?" GUI 1200 provides a text box in container 1222 for inputting response to the question. Additionally, GUI 1200 provides detailed instructions in container 1226 for determining the response to the general instruction 1220. In some embodiments, it may be desirable for the detailed instructions in container 1226 to be as specific as possible to prevent a new analyst from making any logical jumps when determining a response. Accordingly, the detailed instructions may consist of as many steps as necessary to convey to a security analyst exactly which actions to take in completing a task. For example, the detailed instructions may include one step, two steps, three steps, five steps, or ten steps. The detailed instructions 1226 may also include graphical illustrations as well as textual descriptions.

In some embodiments, subsequent tasks may be dynamically created by the Playbook widget. In other words, the next task in a sequence of tasks may be determined based on the response inputted from the preceding task. For example, a first task may ask a security analyst if the security incident is a phishing incident. If the security analyst's response is "no," the security incident may be brought to closure. However, if the security analyst's response is "yes," the Playbook widget may generate one or more additional tasks related to the current incident state or subsequent incident states of the security incident.

Playbook widget 740 may automatically advance to the next incident state upon determining that all tasks within the current incident state are complete. For example, if a security analyst completes all tasks in an Analysis incident state of a particular security incident, Playbook widget may automatically advance the GUI to display the next sequence of tasks to be completed under the Contain incident state. In this way, Playbook widget may eliminate any reporting requirements or ancillary activities a security analyst may have to perform before proceeding to the next state. In some embodiments, a security incident dashboard may not be closed until all tasks within a particular incident state are completed.

FIG. 14 is an illustration of GUI 1400 for facilitating the display of instructions for completing a task 1406 of the Contain incident state 748. By selecting (e.g., via left-clicking) task 1406, GUI 1400 may display a general instruction in container 1410, a text box for inputting a response to the general instruction in container 1412, and any detailed instructions in container 1416. As described above, the task may be a question that must be answered to complete the task. Task 1406 instructs a security analyst to answer the question "Did Others Receive Phishing Email?" GUI 1400 provides a text box in container 1412 for inputting a response to the question. Additionally, GUI 1400 provides detailed instructions in container 1416 for determining the response to the general instruction in container 1410. As illustrated in FIG. 14, the detailed instructions in container 1226 may include graphical illustrations to guide a security analyst in interacting with other features located in, for example, the Explore container.

The Playbook widget may also facilitate the tracking and reporting of metrics for measuring progress. For example, Playbook widget may measure a mean time to identify metric and/or a mean time to contain metric upon completion of the corresponding incident states if a user is following the NIST-800-61 standard. Additionally, a report may be generated for each security incident to communicate the progress in resolving each security incident. For example, the report may include the current state of a particular security incident and which tasks have been completed.

As may be appreciated, the playbook 740 provides an easy and efficient task completion tool for incident response. Task completion, whether investigation, analysis, etc. can be facilitated through individual tasks that are bundled into particular states of the incident response process. Further, by tracking completion of tasks, the playbook 740 can become self-aware of state changes for response to a particular incident and may automatically adjust the state accordingly. For example, when all tasks under the "Contain" state are complete, the state may be automatically adjusted to "Eradicate", indicating that the tasks for the "Eradicate" state are ready to be performed.

Explore Container

As discussed above, a variety of personas with different experience levels may utilize the dashboard 700. For more-experienced personas, incident response for more common incidents may be easily performed without an incident playbook. Additionally, more-experienced personas may be tasked to resolve incidents that are less common or incidents without a corresponding incident playbook. Thus, more-experienced personas may require the ability to easily navigate the abundant amount of data associated with a particular security incident to quickly bring the incident to closure or determine the appropriate steps to codify in an incident playbook. Accordingly, an explore container may be provided by the dashboard to facilitate efficient navigation of data associated with a particular security incident. Additionally, the explore container may be integrated with a number of tools to allow personas of varying levels of experience and/or knowledge to perform context sensitive actions with the data. By allowing the personas to perform the actions with the data without leaving the graphical user interface or corresponding internet portal, the explore container may increase the efficiency and the ease of resolution of security incidents.

Figure 15:
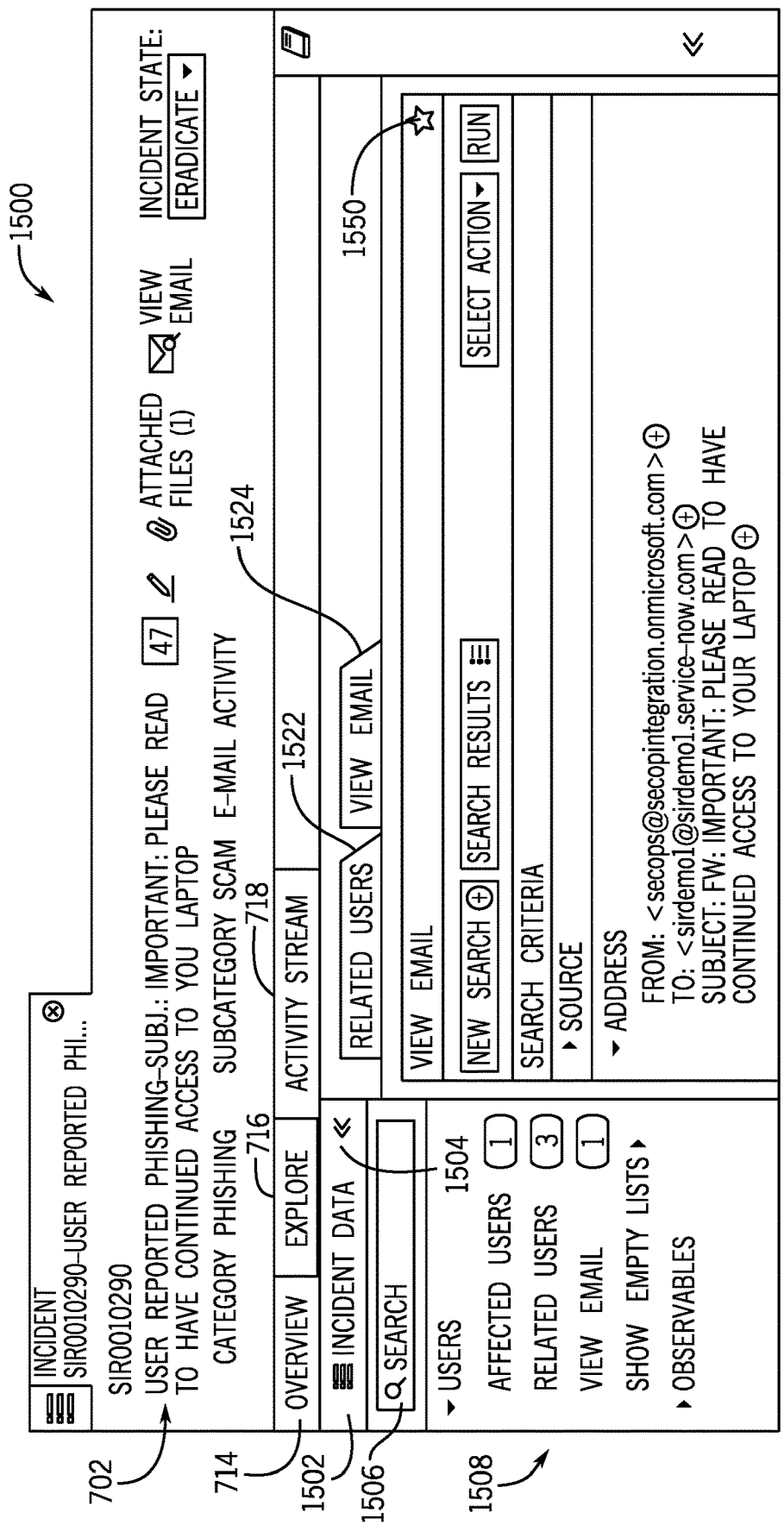
FIG. 15 is an illustration of a GUI for facilitating the display and navigation of a number of lists of data related to a respective security incident, in accordance with an embodiment.

In some embodiments, it may be desirable to analyze data associated with a particular security incident that may not be easily accessible from the Overview container 714. Accordingly, the Explore container 716 may provide lists of data associated with a particular security incident. As illustrated in FIG. 15, GUI 1500 may display an "Incident Data" widget 1502 in Explore container 716 for providing a column 1508 of lists accessible to the current user or analyst. In some embodiments, column 1508 may contain five lists, ten lists, twenty lists, or thirty lists of data. In some embodiments, it may be desirable to hide or minimize the appearance of the Incident Data widget in container 716. By selecting (e.g., via left-clicking) the graphic 1504, GUI 1500 may display a hidden or minimized Incident Data widget.

Figure 16:
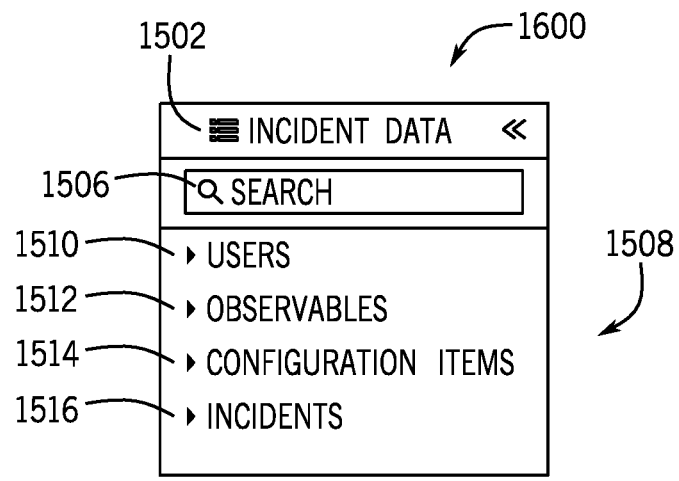
FIG. 16 is an illustration of a GUI for facilitating the display and navigation of a set of categories with each category including one or more lists of data related to a particular security incident, in accordance with an embodiment.
Figure 17:
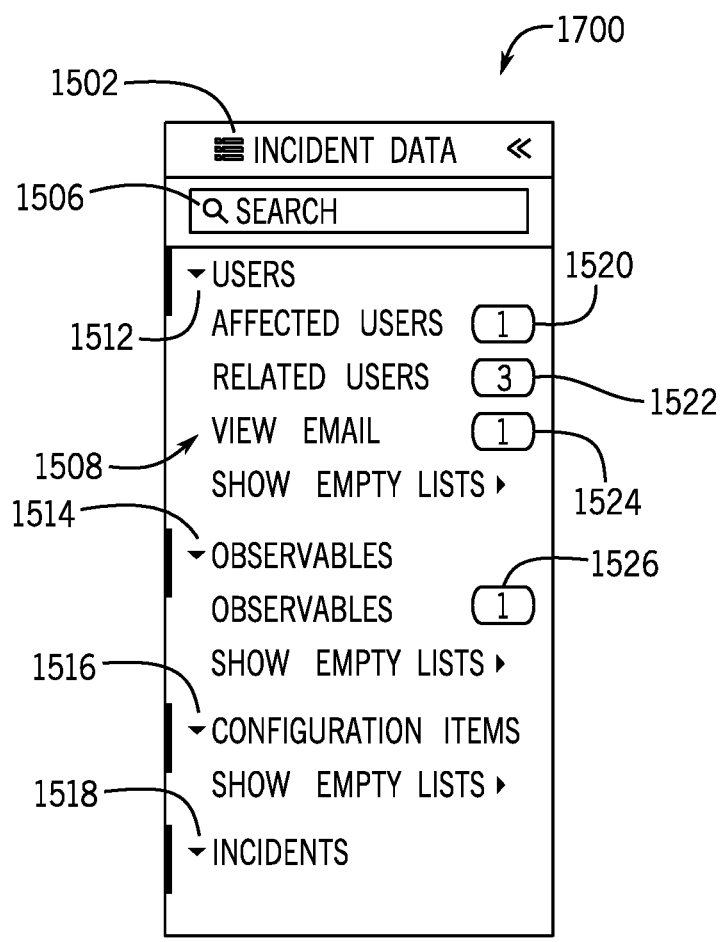
FIG. 17 is an illustration of a GUI for facilitating the display and navigation of a set of categories with each category including one or more lists of data related to a particular security incident, in accordance with an embodiment.

As described above, GUI 1600 may display a column 1508 of categories 1510, 1512, 1514, 1516 in Incident Data widget 1502, as illustrated in FIG. 16. For example, the categories may include Users, Observables, Configuration Items, and Incidents. By selecting (e.g., via left-clicking) the arrow graphic in the header of each category 1510, 1512, 1514, 1516, GUI 1700 may display one or more lists of data 1520, 1522, 1524, 1526 in Incident Data widget 1502 as illustrated in FIG. 17. GUI 1600 may also hide these lists in Incident Data widget 1502 upon selection of the arrow graphic in the header of each category. The header of each list may also include an indicator of the number of data entries or files displayed within each list. For example, if a list contains three data entries or files, the header of the list may display the numeral '3.' In some embodiments, it may be desirable to filter the lists and/or data tabs via a text search 1506. For example, the term "virus" may be entered in text search 1506, resulting in GUI 1500 displaying any lists in Incident Widget 1502 containing the term "virus" in the column 1508 of lists.

Figure 18:
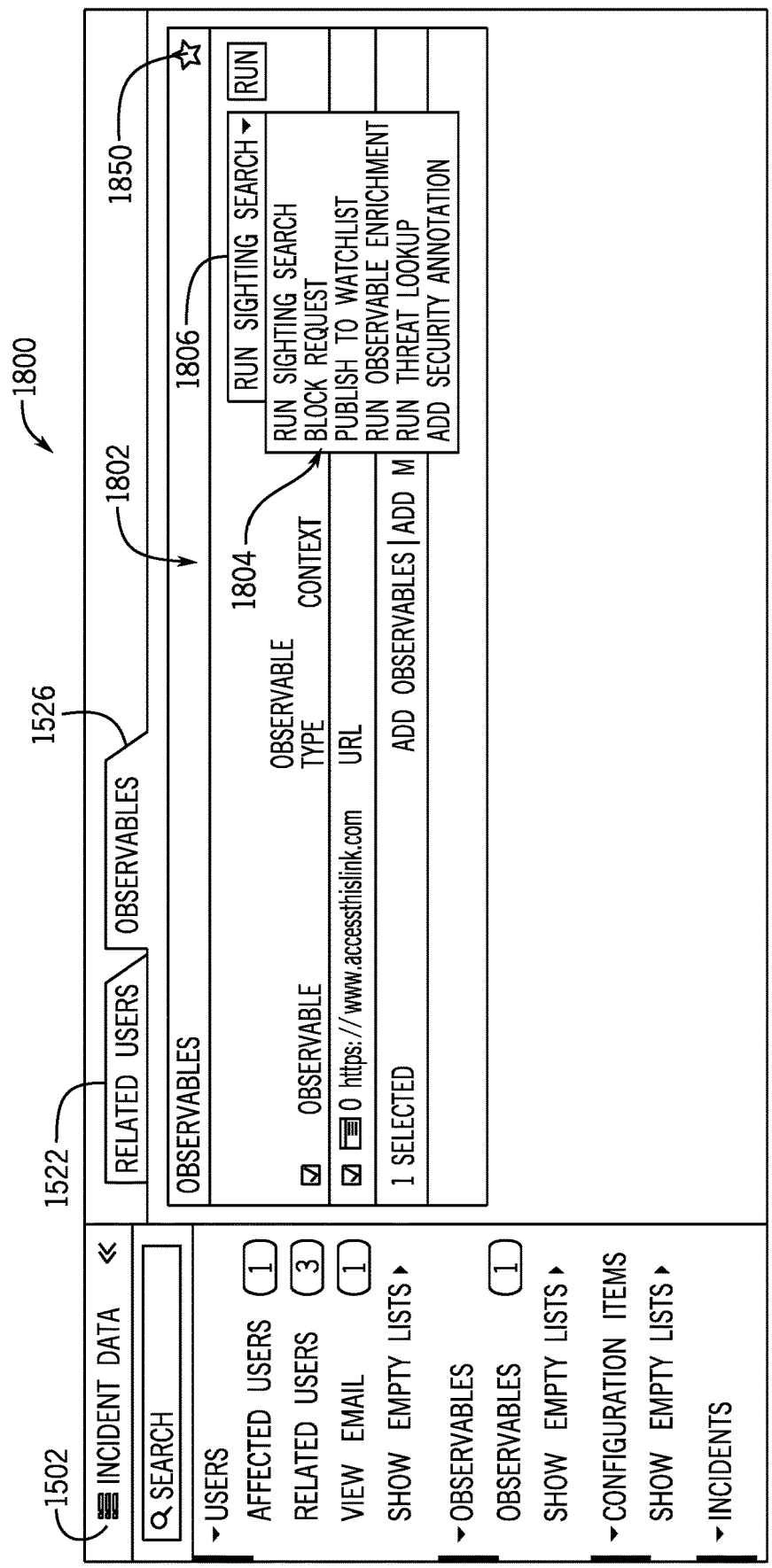
FIG. 18 is an illustration of a GUI for facilitating the display of a list of data related to a particular security incident and navigating a number of options actionable based on the data, in accordance with an embodiment.
Figure 20:
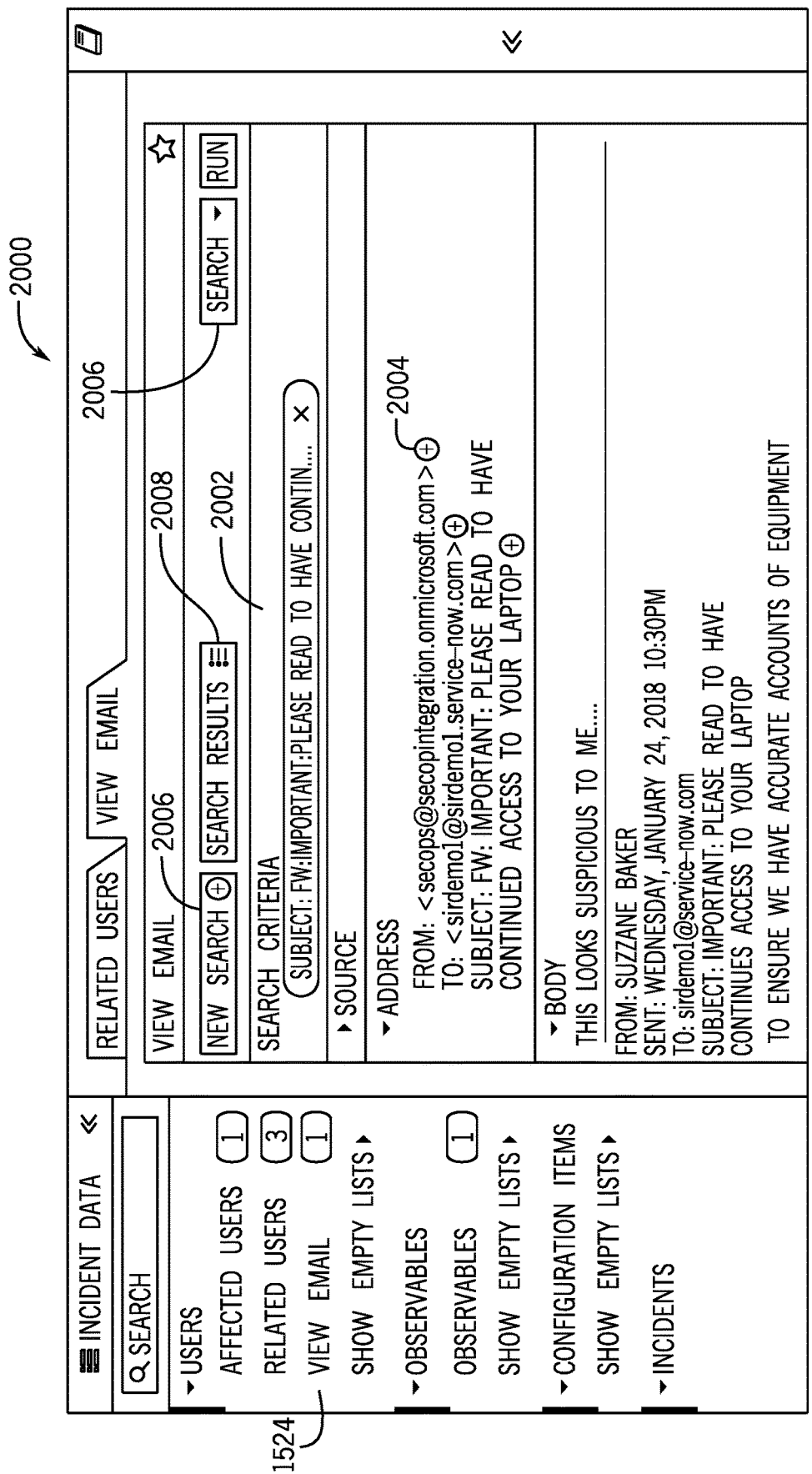
FIG. 20 is an illustration of a GUI for facilitating the rendering of an email associated with a particular security incident and the display of an analytical action performed with data from the email, in accordance with an embodiment.

Additionally, the contents of lists 1520, 1522, 1524, 1526 may be displayed by GUI 1800 in the Explore container 716 as illustrated in FIG. 18. By selecting (e.g., via left-clicking) a list, GUI 1800 displays the contents of the list in Explore container 716. For example, by selecting the "Related Users" list 1522, GUI 1800 may display a Related Users container 1522 within Explore container 716. The Related Users list may include a list of users assigned to similar incidents, a list of users reporting similar incidents, a list of users associated with a particular characteristic of an incident, etc. In another example, by selecting the "Observables" list 1426, GUI 1800 may display an Observables container 1526 within Explore container 716 as illustrated in FIG. 18. The Observables list may include a list of URLs associated with a particular incident, a list of IP addresses associated with a particular incident, a list of file hashes related to a particular incident, or anything defined as an Observable in the system. In another example, by selecting the "View email" list 1524, GUI 1900, 2000 may display a View email container as illustrated in FIGS. 19 and 20. Once one container corresponding to a list is open or displayed in the Explore container, each subsequent opening or displaying of another list will hide the contents of the previously selected list and display the contents of the subsequently selected list. For example, FIG. 15 illustrates the display of the contents of the View email list 1524 but hides the contents of the Related Users list 1522. This allows a user to quickly switch between viewing different lists of data by selecting the headers of each list in Explore container 716 without re-selecting and loading the previously visited lists of data.

Each list container displayed in the Explore container 716 may also include a preference icon 1550, 1850, 1950, 2150. As described above, the preference icon may be selected or de-selected by a user to reproduce the container as a widget on the Overview container 714 described herein.

As illustrated in FIGS. 18, 19, and 20, each list container may include a drop down list of actions to be performed on data items displayed in the container. For example, FIG. 18 illustrates the display of the Observables container 1802 in the Explore container 716. By selecting (e.g., via left-clicking the box graphic) the uniform resource locator (URL) and selecting the drop-down list 1806, GUI 1800 may display a number of actions 1804 that may be performed based on the URL. For instance, the "Run Sighting Search" action in drop-down list 1806 may send an investigative request to look historically in one or more databases to determine if the URL has been archived in any security logs. The "Block Request" action in drop-down list 1806 may log the URL in a database and prevent a user from visiting a website via the URL address. The "Publish to Watchlist" action in drop-down list 1806 may log the URL in a threat filtering system which may subsequently provide an indication of an alert when the URL is detected in any file that passes through the system. The "Run Observable Enrichment" action in drop-down list 1806 may determine characteristics associated with the URL, such as the date and/or time the URL was registered or the identity and/or the nationality of the person who registered the URL. The "Run Threat Lookup" action in drop-down list 1806 may send a request to an external system to provide a recommendation or a determination that the URL is malicious.

In some embodiments, it may be desirable to only display actions that may actually be performed on the selected data item in the drop down list 1806. Accordingly, the types of actions displayed in the drop down list 1806 may depend on the selected data item that relates to the capability framework that security analysts follow. For example, FIGS. 19 and 20 illustrate the display of the View email container by GUI 1900, 2000 in the Explore container 716. GUI 1900, 2000 renders a reproduction of the email associated with the security incident in the View email container. For example, the address heading of the email is reproduced in the address window 1908, and the body of the email is reproduced in the body window 1910. GUI 1900, 2000 may also display a source of the email in source window 1906 within View email container. By selecting the action drop-down list 1902, a number of actions (not depicted) may be displayed for a user or a security analyst to perform on the email. As illustrated in FIG. 20, a "Search" action may be selected to search any data element visualized in the View email container upon selection of search graphic 2004. For example, the subject line of the email may be selected for the search action 2006. Upon selection, the subject line may be reproduced in a search criteria window 2002. Once the search is performed (e.g., via selection of search graphic 2004), a user or a security analyst may select the "Search Results" option 2008 to view the results of the search. An option 2006 to conduct a new search may also be displayed in the View email container once the Search option 2006 has been selected. The New Search option 2006 may clear the search criteria window 2002 of the previous search until new data elements are selected to be searched.

As described above, the Explore container 716 facilitates the performance of any actions, such as examining an email and running a search, without leaving the GUI to use other application and/or tools for the same tasks.

Activity Stream Container

As discussed above, a variety of personas with different experience levels may utilize the dashboard 700. More-experienced personas and/or managerial personas may need the ability to determine that security analysts are correctly assigned to a particular incident and to ensure that the appropriate amount of progress is being made for each incident. Additionally, managerial personas may require an audit trail that includes all actions performed with respect to a particular security incident. Accordingly, the graphical user interface may provide a view with an indication of the current state of a particular security incident as well as a history of all actions, user-made and/or machine-made, performed regarding the security incident. This view may facilitate a quick and easy understanding of the history and current state of an incident at any time. Additionally, this view may minimize any ancillary activities of security analysts assigned to a security incident to report their progress to their supervisors after the completion of each task, step, or state of an incident response.

Returning to the dashboard, the discussion now proceeds to the "Activity Stream" container 718. As mentioned above, the "Activity Stream" container may be useful to provide an overview of all activities that have been performed with regard to a particular incident.

FIG. 21 is an illustration of a GUI for facilitating a record of every action that has occurred with respect to a security incident. The "Activity Stream" container 718 may list all user-performed actions and/or machine-performed actions taken with respect to a particular security incident. For example, GUI 2100 may display in Activity Stream container 718 a text entry 2104 by a user made via the Work Notes widget 724 in the Overview container 714. Activity Stream container 718 may also provide an indication 2106 when the state of a security incident changes to a subsequent state in the workflow. Further, Activity Stream container 718 may also indicate any actions 2108 performed by the system, such as the actions performed on data elements described above.

As mentioned above, the tasks may be associated with particular states within the incident response process. In some embodiments, it may be desirable to filter the displayed actions in the Activity Stream container 716 via a text search 2110. For example, the term "Eradicate" may be entered into text search 2110, resulting in GUI 2100 displaying any actions containing the term "Eradicate" in Activity Stream container 716. This may provide efficient access to a subset of a large number of activity entries, resulting in significant time-savings.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples, including the best mode, and also to enable any person skilled in the art to practice the invention, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A tangible, non-transitory, machine-readable medium, comprising machine-readable instructions that, when executed by one or more processors, cause the one or more processors to:

receive a first indication of a first security incident record stored in a first security incident record data store, the first security incident record identifying a first security incident;

generate and transmit, to a computing device, a security incident response graphical user interface (GUI) associated with an instance of a cloud service platform, comprising a first dashboard configured to interchangeably display a plurality of containers in response to respective user selections of respective headers associated with the plurality of containers in the first dashboard, the first dashboard comprising a playbook associated with the first security incident record, wherein the playbook comprises a series of tasks to be implemented for resolution of the first security incident, the playbook is simultaneously presented with at least one container of the plurality of containers in the first dashboard, and wherein the plurality of containers comprise:

a first overview container comprising one or more widgets related to the first security incident record;

a first explore container comprising a set of security incident data categories, each security incident data category of the set of security incident data categories having one or more lists of records associated with the first security incident record; and a first activity stream container comprising a history of user actions, machine actions, or both, associated with the first security incident record;

receive a user selection of a header of the first explore container;

render, in the first dashboard via the security incident response GUI, the first explore container and the one or more lists of records with a set of selectable actions associated with the one or more lists of records;

receive a user selection of one of the set of selectable actions; and implement an action associated with one of the set of selectable actions, based upon the user selection, without leaving the first dashboard.

2. The machine-readable medium of claim 1, comprising machine-readable instructions that, when executed by the one or more processors, cause the one or more processors to receive the first indication of the first security incident record based upon a user selection, from within a graphical security incident queue, the user selection providing a request to generate the security incident response GUI.

3. The machine-readable medium of claim 2, comprising machine-readable instructions that, when executed by the one or more processors, cause the one or more processors to:
prioritize a set of security incident records; and
generate the graphical security incident queue, wherein the graphical security incident queue comprises the prioritized set of security incident records.

4. The machine-readable medium of claim 1, comprising machine-readable instructions that, when executed by the one or more processors, cause the one or more processors to:
provide, via the security incident response GUI, one or more selectable preference icons that, when selected, provide an indication of the one or more widgets.

5. The machine-readable medium of claim 1, comprising machine-readable instructions that, when executed by the one or more processors, cause the one or more processors to:
identify a category and a subcategory of the first security incident record; and
select a default set of widgets as the one or more widgets, based upon the category and the subcategory.

6. The machine-readable medium of claim 5, comprising machine-readable instructions that, when executed by the one or more processors, cause the one or more processors to:
identify the category as a phishing security incident and the subcategory as an e-mail related activity; and
assign an e-mail viewer widget, e-mail attachment widget, or both as at least a portion of the default set of widgets.

7. The machine-readable medium of claim 1, comprising machine-readable instructions that, when executed by the one or more processors, cause the one or more processors to:
receive a size or placement request, via the security incident response GUI, requesting a change to a size, a placement, or both, to at least one of the one or more widgets; and
render the one or more widgets, in accordance with the size or placement request.

8. The machine-readable medium of claim 1, comprising machine-readable instructions that, when executed by the one or more processors, cause the one or more processors to:
receive a minimize or expand request, via the security incident response GUI; and
render the one or more widgets, in accordance with the minimize or expand request.

9. The machine-readable medium of claim 1, wherein the set of security incident data categories comprise:
a users category, comprising at least one list of user records associated with the first security incident record;
an observables category, comprising at least one list of observable records associated with the first security incident record;
a configuration items category, comprising at least one list of configuration item records associated with the first security incident record; and
an incidents category, comprising one or more security incident records associated with the first security incident record.

10. The machine-readable medium of claim 9, wherein the at least one list of user records comprise an affected users list and a related users list.

11. The machine-readable medium of claim 1, comprising machine-readable instructions that, when executed by the one or more processors, cause the one or more processors to:
receive a second indication of a second security incident record stored in a second incident record data store, the second security incident record identifying a second security incident;
wherein the security incident response GUI, comprises a second dashboard, comprising:
a second overview container comprising one or more widgets related to the second security incident record;
a second explore container comprising a set of security incident data categories, each having one or more lists of records associated with the second security incident record; and
a second activity stream container comprising a list of all actions associated with the second security incident record.

12. The machine-readable medium of claim 11, comprising machine-readable instructions that, when executed by the one or more processors, cause the one or more processors to:
render a first selectable incident header with the first dashboard;
render a second selectable incident header with the second dashboard; and receive a user display indication of the first security incident record based upon a user display selection of the first selectable incident header, the user display selection providing a request to generate and present the security incident response GUI comprising the first dashboard and to hide the second dashboard.

13. The machine-readable medium of claim 1, comprising machine-readable instructions that, when executed by the one or more processors, cause the one or more processors to:
render a selectable completion indicator with each of the series of tasks;
receive a selection of the selectable completion indicator for a particular one of the series of tasks; and
associate a completed state with the particular one of the series of tasks, based upon the selection of the selectable completion indicator.

14. The machine-readable medium of claim 1, comprising machine-readable instructions that, when executed by the one or more processors, cause the one or more processors to:
group the series of tasks into one or more security incident state groupings, based upon a subset of the series of tasks that, when completed, transition the security incident state grouping to another security incident state grouping; and
render the series of tasks with an indication of the security incident state groupings.

15. The machine-readable medium of claim 14, comprising machine-readable instructions that, when executed by the one or more processors, cause the one or more processors to:
identify each of the one or more security incident state groupings having a completed subset of the series of tasks; and
render a completion indication for each of the one or more security incident state groupings having the completed subset of the series of tasks.

16. The machine-readable medium of claim 1, comprising machine-readable instructions that, when executed by the one or more processors, cause the one or more processors to:
render a selectable playbook expansion icon with the playbook;
receive an indication of a selection of the playbook expansion icon; and
render an expanded playbook view, based upon the indication of the selection of the playbook expansion icon;
wherein the expanded playbook view, comprises a summary of the playbook and a workflow of the series of tasks.

17. The machine-readable medium of claim 1, comprising machine-readable instructions that, when executed by the one or more processors, cause the one or more processors to:
receive an indication of a selection of one of the series of tasks; and
render an expanded task view, based upon the indication of the selection of the one of the series of tasks;
wherein the expanded task view, comprises additional detail regarding the one of the series of tasks.

18. The machine-readable medium of claim 1, wherein the first security incident is associated with at least one monitored configuration item (CI) of a computer network.

19. A security incident response system, comprising:
at least one computer, configured to:
receive an indication of a security incident record stored in a security incident record data store, the security incident record identifying a security incident;
generate and transmit, to a computing device, a security incident response graphical user interface (GUI) associated with an instance of a cloud service platform, comprising a dashboard configured to interchangeably display a plurality of containers in response to respective user selections of respective headers associated with the plurality of containers in the dashboard, the dashboard comprising a playbook associated with the security incident record, wherein the playbook comprises a series of task to be implemented for resolution of the security incident, the playbook is simultaneously presented with at least one container of the plurality of containers in the dashboard, and wherein the plurality of containers comprise:
an overview container comprising one or more widgets related to the security incident record;
an explore container comprising a set of security incident data categories, each security incident data category of the set of security incident data categories having one or more lists of records associated with the security incident record; and
an activity stream container comprising a history of user actions, machine actions, or both, associated with the security incident record;
receive a user selection of a header of the activity stream container; and
generate and render, in the dashboard via the security incident response GUI, the activity stream container and a graphical representation of the history of the user actions, the machine actions, or both.

20. The security incident response system of claim 19, wherein the at least one computer is configured to:
receive the indication of the security incident record based upon a user selection, from within a graphical security incident queue, the user selection providing a request to generate the security incident response GUI.

21. The security incident response system of claim 20, wherein the at least one computer is configured to:
prioritize a set of security incident records; and
generate the graphical security incident queue, wherein the graphical security incident queue comprises the prioritized set of security incidents.

22. The security incident response system of claim 19, wherein the at least one computer is configured to:
identify a category and a subcategory of the security incident record; and
select a default set of widgets as the one or more widgets, based upon the category and the subcategory.

23. The security incident response system of claim 19, wherein the at least one computer is configured to:
receive a second user selection of a header of the explore container;
render, in the dashboard via the security incident response GUI, the explore container and the one or more lists of records with a set of selectable actions associated with the one or more lists of records;
receiving a third user selection of one of the set of selectable actions; and
implementing an action associated with one of the set of selectable actions, based upon the third user selection, without leaving the dashboard.

24. A tangible, non-transitory, machine-readable medium, comprising machine-readable instructions that, when executed by one or more processors, cause the one or more processors to:

receive an indication of a security incident record stored in a security incident record data store, the security incident record identifying a security incident;

identify a category and a subcategory of the security incident record;

select a playbook based on the category and the subcategory, from one or more playbooks stored in a playbook data store; and generate and transmit, to a computing device, a security incident response graphical user interface (GUI) associated with an instance of a cloud service platform, comprising a dashboard configured to interchangeably display a plurality of containers in response to respective user selections of respective headers associated with the plurality of containers in the dashboard, the dashboard comprising the selected playbook, wherein the playbook comprises a series of tasks to be implemented for resolution of the security incident, the playbook is simultaneously presented with at least one container of the plurality of containers in the dashboard, and wherein the plurality of containers comprise:

an overview container comprising one or more widgets related to the security incident record;

a first explore container comprising a set of security incident data categories, each security incident data category of the set of security incident data categories having one or more lists of records associated with the security incident record; and a first activity stream container comprising a history of user actions, machine actions, or both, associated with the security incident record.

25. The machine-readable medium of claim 24, comprising machine-readable instructions that, when executed by the one or more processors, cause the one or more processors to:

determine whether a user of the computing device has a junior persona or a senior persona;

in response to determining that the user of the computing device has the junior persona, rendering the series of tasks of the playbook with detailed instructions for addressing each task of the series of tasks; and in response to determining that the user of the computing device has the senior persona, rendering the series of tasks of the playbook without the detailed instructions for addressing each task of the series of tasks.

* * * * *